(12) United States Patent
Li et al.

(10) Patent No.: US 12,556,775 B2
(45) Date of Patent: Feb. 17, 2026

(54) DISPLAY APPARATUS

(71) Applicant: VIDAA (NETHERLANDS) INTERNATIONAL HOLDINGS B.V., Duiven (NL)

(72) Inventors: Mengyuan Li, Duiven (NL); Kai Sun, Duiven (NL); Ying Zhou, Duiven (NL); Qingna Liu, Duiven (NL); Wenxiao Liu, Duiven (NL); Dawei Zhang, Duiven (NL); Rui Hu, Duiven (NL); Xiujuan Zhu, Duiven (NL)

(73) Assignee: VIDAA (NETHERLANDS) INTERNATIONAL HOLDINGS B.V., Duiven (NL)

( * ) Notice: Subject to any disclaimer, the term of this patent is extended or adjusted under 35 U.S.C. 154(b) by 306 days.

(21) Appl. No.: 18/538,925

(22) Filed: Dec. 13, 2023

(65) Prior Publication Data

US 2024/0121482 A1    Apr. 11, 2024

Related U.S. Application Data

(63) Continuation of application No. PCT/EP2022/069544, filed on Jul. 13, 2022.

(30) Foreign Application Priority Data

Jul. 13, 2021 (CN) .......................... 202110791232.3
Jul. 21, 2021 (CN) .......................... 202110823318.X
Aug. 3, 2021 (CN) .......................... 202110895068.0

(51) Int. Cl.
*H04N 21/482* (2011.01)
*H04N 21/472* (2011.01)
*H04N 21/488* (2011.01)

(52) U.S. Cl.
CPC ... *H04N 21/4821* (2013.01); *H04N 21/47217* (2013.01); *H04N 21/4884* (2013.01)

(58) Field of Classification Search
CPC ......... H04N 21/4821; H04N 21/47217; H04N 21/4884; H04N 21/485
See application file for complete search history.

(56) References Cited

U.S. PATENT DOCUMENTS

| 10,089,985 B2 | 10/2018 | Mishra et al. |
| 2008/0301735 A1 | 12/2008 | Chicles |

(Continued)

FOREIGN PATENT DOCUMENTS

| CN | 1842143 A | 10/2006 |
| CN | 101087378 A | 12/2007 |

(Continued)

OTHER PUBLICATIONS

The World Intellectual Property Organization (WIPO) International Search Report and Written Opinion for PCT/EP2022/069544 Nov. 15, 2022 3 pages.

*Primary Examiner* — Kunal Langhnoja
(74) *Attorney, Agent, or Firm* — ANOVA LAW GROUP, PLLC

(57) ABSTRACT

The disclosure is directed to a display apparatus, including: a display configured to display a user interface for presenting an electronic program guide; and a first controller configured to: send a first request including live broadcast information to cause a server to determine replay data according to a first live broadcast program included in the live broadcast information; receive the replay data from the server, and control the electronic program guide to display a second live broadcast program with a visual replay identifier.

18 Claims, 19 Drawing Sheets

(56) References Cited

U.S. PATENT DOCUMENTS

| | | | |
|---|---|---|---|
| 2010/0083316 A1 | 4/2010 | Togashi et al. | |
| 2010/0205632 A1* | 8/2010 | VanDuyn | H04N 21/4312 725/39 |
| 2014/0229999 A1* | 8/2014 | Hannum | H04N 21/2387 725/88 |
| 2015/0038203 A1 | 2/2015 | Cho | |
| 2015/0382031 A1* | 12/2015 | Truong | H04N 21/4821 725/86 |

FOREIGN PATENT DOCUMENTS

| | | |
|---|---|---|
| CN | 102023805 A | 4/2011 |
| CN | 102111915 A | 6/2011 |
| CN | 102469373 A | 5/2012 |
| CN | 103618963 A | 3/2014 |
| CN | 103731547 A | 4/2014 |
| CN | 103763581 A | 4/2014 |
| CN | 104156189 A | 11/2014 |
| CN | 105187919 A | 12/2015 |
| CN | 107567713 A | 1/2018 |
| CN | 109101207 A | 12/2018 |
| CN | 109783043 A | 5/2019 |
| CN | 111010597 A | 4/2020 |
| CN | 111405373 A | 7/2020 |
| CN | 111414216 A | 7/2020 |
| CN | 111432256 A | 7/2020 |
| CN | 111475091 A | 7/2020 |
| CN | 112040305 A | 12/2020 |
| GB | 2443959 A | 5/2008 |
| JP | 2000115652 A | 4/2000 |
| JP | 2006227363 A | 8/2006 |
| JP | 2006284645 A | 10/2006 |
| JP | 2007116384 A | 5/2007 |
| KR | 20020003964 A | 1/2002 |
| WO | 2015198192 A1 | 12/2015 |
| WO | 2020192400 A1 | 10/2020 |

\* cited by examiner

DISPLAY APPARATUS

CROSS-REFERENCE OF RELATED APPLICATIONS

This application claims is a continuation application of International Application No. PCT/EP2022/069544, filed on Jul. 13, 2022, which claims priorities to Chinese Patent Application No. 202110791232.3 filed on Jul. 13, 2021, Chinese Patent Application No. 202110823318.X filed on Jul. 21, 2021, and Chinese Patent Application No. 202110895068.0 filed on Aug. 3, 2021, which are hereby incorporated by reference in their entireties.

FIELD

The disclosure relates to the field of display technologies, and particularly to a display apparatus.

BACKGROUND

An EPG (Electronic Program Guide) is an application that enables users to quickly know program information of channels, collects program information and make the program information of channels available for users to query and browse. A user may watch a television program of a specific channel at specific time through the EPG.

In playing process of some live broadcast television programs, a smart television plays television programs shown in the EPG according to accessed live signal sources, including: playing corresponding television programs from different channels at different times. A user watches the live broadcast television programs mainly by way of switching channels, or watching according to the program guide.

However, when the user replays some missed television programs in live broadcasting, the user needs to exit the live broadcasting mode and enter a video application to search for resources to realize the replay. When the video application cannot provide the program for replay, the user may spend a lot of searching time in vain. When the user replays programs from a plurality of channels, multiple searches are required and some programs still cannot be found for replay.

SUMMARY

Some embodiments of the disclosure provide a display apparatus, including: a display configured to display a user interface for presenting an electronic program guide, EPG a first controller in connection with the display configured to: present a first interface of the EPG on the user interface, where the electronic program guide includes a first channel list and a first program list, and the first program list includes one or more live broadcast programs; read a list of live channels at a current moment and encode the list of live channels to generate live broadcast information; send a first request including the live broadcast information to a server for the server to detect live broadcast programs supporting replay according to the live broadcast information and generate replay data, where the first request is configured to cause the server to determine replay data to be provided to the display apparatus according to a first live broadcast program included in the live broadcast information, and the replay data includes identifier information about a first media file for replaying a first live broadcast program in a time period except for a live broadcast period of the first live broadcast program; receive the replay data sent from the server, and in response to the replay data including identifier information about a second media file for replaying a second live broadcast program in a time period except for a live broadcast period of the second live broadcast program, control the electronic program guide to display the second live broadcast program with a visual replay identifier, where an information bar displayed during live broadcast of the second live broadcast program includes a replay control, and the replay control is configured to cause the first controller to control the user interface to play the second media file.

Some embodiments of the disclosure provide a method for displaying a live broadcast program, including: presenting a first interface of an electronic program guide, EPG, on a user interface, where the electronic program guide includes a first channel list and a first program list, and the first program list includes one or more live broadcast programs; reading a list of live channels at a current moment and encoding the list of live channels to generate live broadcast information; sending a first request including the live broadcast information to a server for the server to detect live broadcast programs supporting replay according to the live broadcast information and generate replay data, where the first request is configured to cause the server to determine replay data to be provided to the display apparatus according to a first live broadcast program included in the live broadcast information, and the replay data includes identifier information about a first media file for replaying a first live broadcast program in a time period except for a live broadcast period of the first live broadcast program; receiving the replay data sent from the server, and in response to the replay data including identifier information about a second media file for replaying a second live broadcast program in a time period except for a live broadcast period of the second live broadcast program, controlling the electronic program guide to display the second live broadcast program with a visual replay identifier, where an information bar displayed during live broadcast of the second live broadcast program includes a replay control, and the replay control is configured to control the user interface to play the second media file.

Some embodiments of the disclosure provide a display apparatus, including: a display configured to present a user interface; a controller in connection with the display, where the controller is configured to: while connecting with an external device, receive image data sent from the external device, and present image content corresponding to the image data in the user interface of the display apparatus; in response to a command for displaying information from a user, determine whether a data type of the image data is a specified data type; if the data type of the image data is the specified data type, periodically obtain a peripheral display parameter corresponding to the specified data type of the external device and a peripheral image parameter generated when the image data of the specified data type is sent; present an information bar in the user interface, and present the peripheral display parameter corresponding to the specified data type and the peripheral image parameter in the information bar.

Some embodiments of the disclosure provide a method for displaying information in an information bar, including: while the display apparatus is connecting with an external device, receiving image data sent from the external device, and presenting image content corresponding to the image data in a user interface of a display apparatus; in response to a command for displaying information from a user, determining whether a data type of the image data is a specified data type; if the data type of the image data is the specified data type, periodically obtaining a peripheral display parameter corresponding to the specified data type of the external device and a peripheral image parameter generated when the image data of the specified data type is sent; presenting an information bar in the user interface, and presenting the peripheral display parameter corresponding to the specified data type and the peripheral image parameter in the information bar.

DETAILED DESCRIPTION OF EMBODIMENTS

In order to make purposes and embodiments of the disclosure clearer, embodiments of the disclosure will be described clearly and completely below in combination with the accompanying drawings in embodiments of the disclosure. Obviously, the described embodiments are some but not all embodiments.

It should be noted that the brief description of the terms in the disclosure is only for the convenience of understanding embodiments described hereafter, and is not intended to limit embodiments of the disclosure. Unless otherwise specified, these terms should be understood according to the ordinary and plain meanings.

Figure 1:
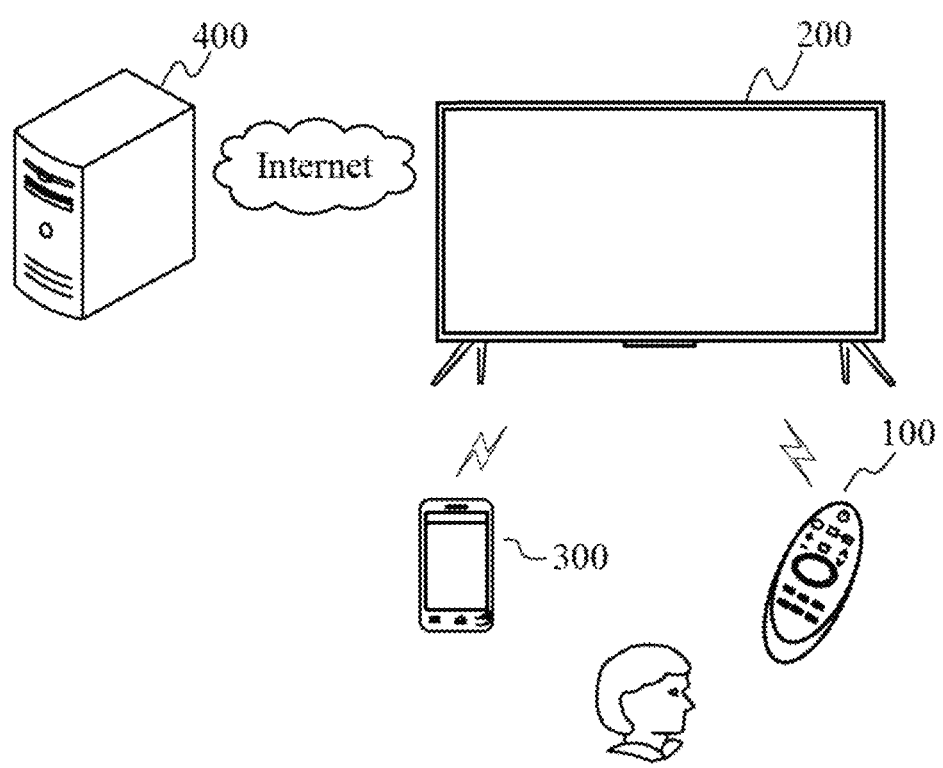
FIG. 1 is a schematic diagram of an operation scenario between a display apparatus and a control device according to some embodiments.

FIG. 1 is a schematic diagram of an operation scenario between a display apparatus and a control device according to embodiments. As shown in FIG. 1, a user may operate a display apparatus 200 through a smart device 300 or a control device 100.

In some embodiments, the control device 100 may be a remote control, and the communication between the remote control and the display apparatus includes infrared protocol communication or Bluetooth protocol communication and other short-range communication methods. The display apparatus 200 is controlled wirelessly or by wired methods. In some embodiments, the smart device 300 (e.g., a mobile terminal, a tablet computer, a computer, a notebook computer, etc.) may also be configured to control the display apparatus 200. For example, an application running on the smart device is configured to control the display apparatus 200. The display apparatus 200 also performs data communication with the server 400. The display apparatus 200 may be allowed to perform communication and connection through a Local Area Network (LAN), a Wireless Local Area Network (WLAN), and other networks.

Figure 2:
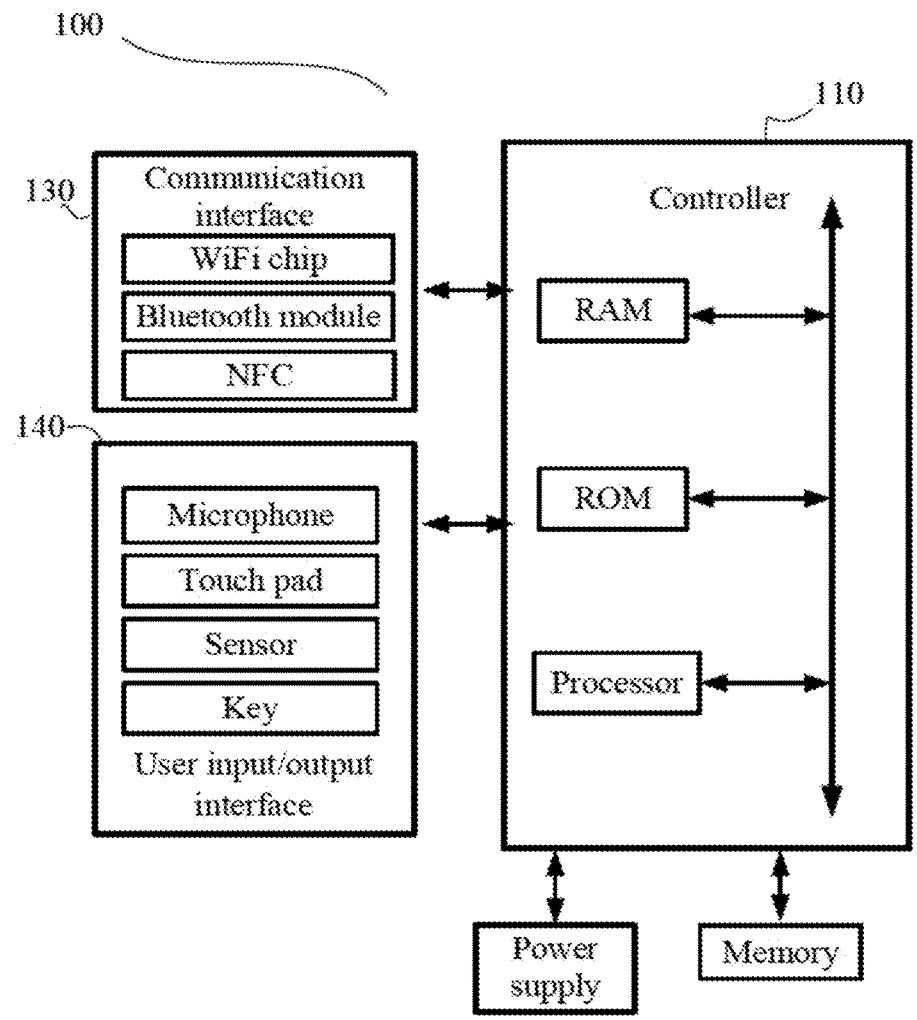
FIG. 2 is a block diagram of a hardware configuration of the control device 100 according to some embodiments.

FIG. 2 is a block diagram of the configuration of the control device 100 according to embodiments. As shown in FIG. 2, the control device 100 includes a controller 110, a communication interface 130, a user input/output interface 140, a memory, and a power supply. The control device 100 may receive an input operation command from a user and convert the operation command into an instruction that can be recognized and responded by the display apparatus 200, playing an intermediary role between the user and the display apparatus 200.

Figure 3:
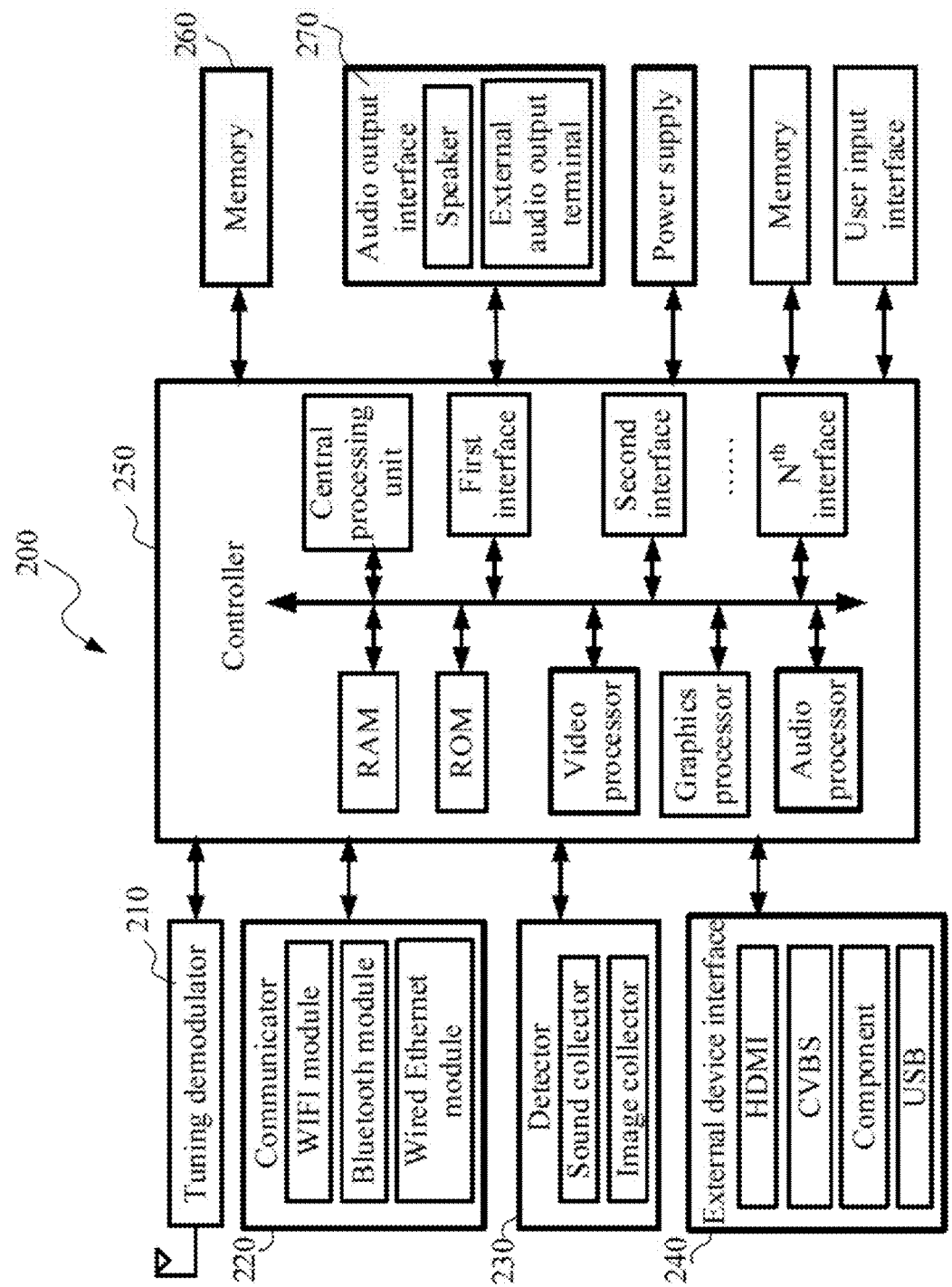
FIG. 3 is a block diagram of a hardware configuration of the display apparatus 200 according to some embodiments.

FIG. 3 is a block diagram of a hardware configuration of the display apparatus 200 according to embodiments.

In some embodiments, the display apparatus 200 includes at least one of a tuning demodulator 210, a communicator 220, a detector 230, an external device interface 240, a controller 250, a display 260, an audio output interface 270, a memory, a power supply, a user input interface.

In some embodiments, the controller includes a processor, a video processor, an audio processor, a graphics processor, an RAM, an ROM, first to $n^{th}$ interfaces for input/output.

In some embodiments, the communicator 220 is a component for communicating with an external device or server according to various types of communication protocols. For example, the communicator may include at least one of a Wifi module, a Bluetooth module, a wired Ethernet module, other network communication protocol chip or near-field communication protocol chip, and an infrared receiver. The display apparatus 200 may send and receive control signals and data signals with the external control device 100 or the server 400 through the communicator 220.

In some embodiments, the user input interface may be configured to receive a control signal or a voice control instruction of the control device 100 (e.g., infrared remote control, etc.).

In some embodiments, the external device interface 240 may include, but is not limited to, any one or more of a High-Definition Multimedia Interface (HDMI), an analog or data high-definition component input interface (Component), a Composite Video Broadcast Signal (CVBS) input interface, a USB input interface (USB), an RGB terminal.

In some embodiments, the tuning demodulator 210 receives broadcast television signals through a wired or wireless manner, and demodulates audio and video signals, such as EPG data signals, from a plurality of wireless or wired broadcast television signals.

In some embodiments, the controller 250 and the tuning demodulator 210 may be located in different separate devices, that is, the tuning demodulator 210 may also be located in an external device (such as an external set-top box, etc.) of a main device where the controller 250 is located.

In some embodiments, the controller 250 controls operations of the display apparatus and responds to the user's operations through various software control programs stored in the memory. The controller 250 controls the overall operation of the display apparatus 200.

In some embodiments, the controller includes at least one of a Central Processing Unit (CPU), a video processor, an audio processor, a Graphics Processing Unit (GPU), an RAM (Random Access Memory), an ROM (Read-Only Memory), first to $n^{th}$ interfaces for input/output, a communication bus (Bus), etc.

Figure 4:
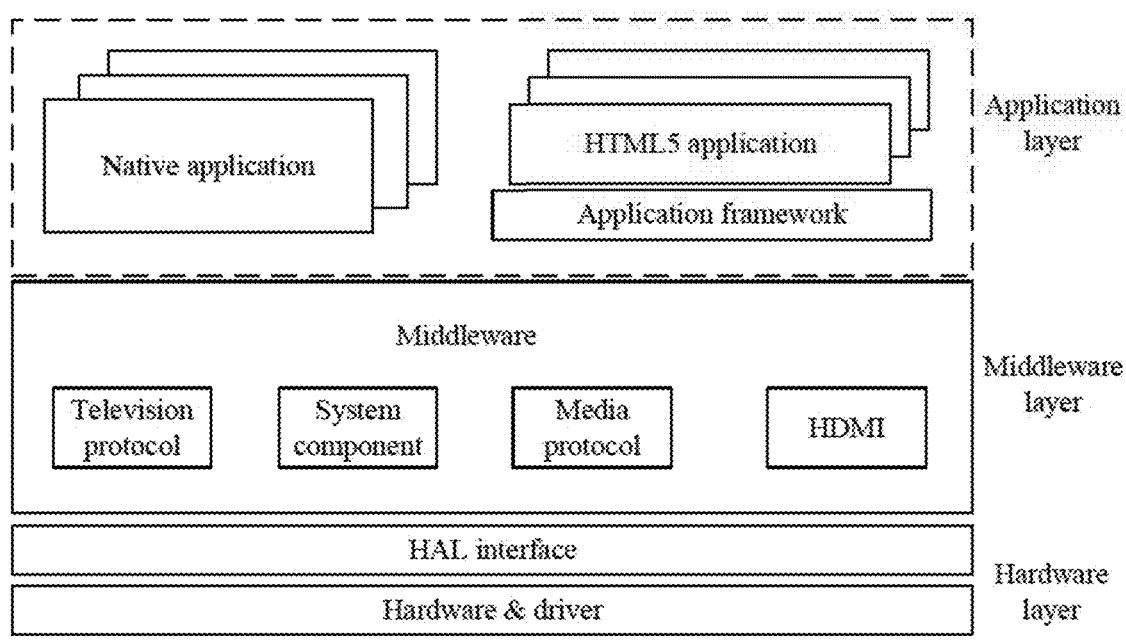
FIG. 4 is a software configuration diagram in the display apparatus 200 according to some embodiments.

As shown in FIG. 4, the system of the display apparatus is divided into three layers, which are respectively an application layer, a middleware layer and a hardware layer from top to bottom.

The application layer mainly includes common applications on television and Application Framework. The common applications are mainly applications developed based on Browser, such as: HTML5 APPs; and native applications (Native APPs).

The Application Framework is a complete program model, with all basic functions required by the standard application software, such as: file access, data exchange, . . . , and use interfaces (toolbar, status bar, menu, dialog) of these functions.

The Native APPs can support online or offline work, message push or local resource access.

The middleware layer includes middleware such as various television protocols, multimedia protocols and system components. The middleware can use basic services (functions) provided by the system software to connect various parts of the application system or different applications on the network, and can achieve resource sharing and function sharing.

The hardware layer mainly includes an HAL interface, hardware and drivers. The HAL interface is a unified interface for all television chips, and the specific logic is implemented by each chip. The drivers mainly include: audio driver, panel driver, Bluetooth driver, camera driver, WIFI driver, USB driver, HDMI driver, sensor driver (such as fingerprint sensor, temperature sensor, pressure sensor, etc.), and power driver, etc.

Figure 5A:
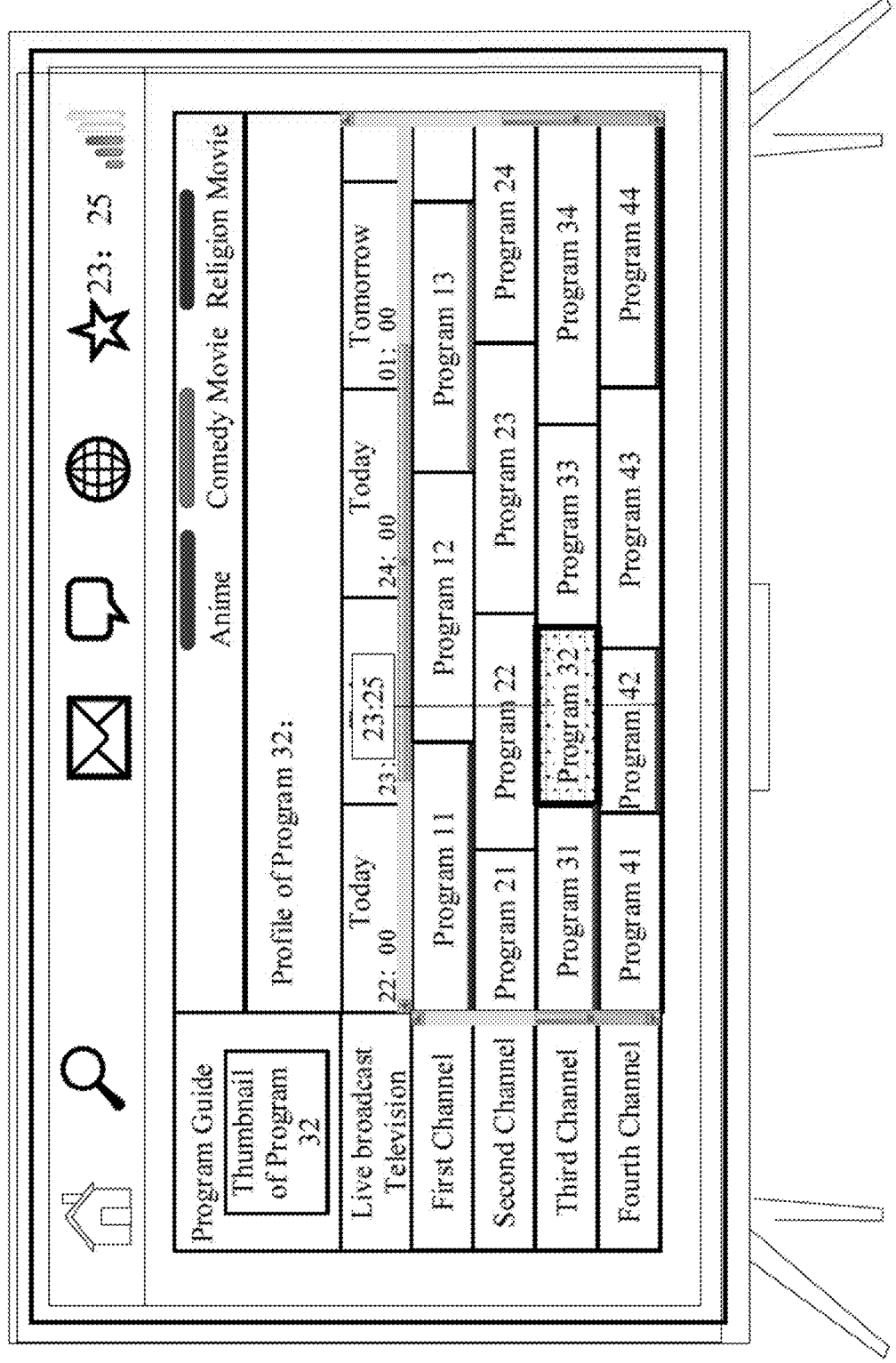
FIG. 5A is a schematic diagram of a user interface of the program guide of the display apparatus according to an embodiment of the disclosure.

FIG. 5A is a schematic diagram of a user interface of the electronic program guide of the display apparatus according to some embodiments of the disclosure.

In some embodiments, the display apparatus includes a display configured to display a user interface for presenting an electronic program guide. Here, when the electronic program guide is presented, most area of the display screen is configured to display the program information included in the electronic program guide.

As shown in the schematic diagram of the user interface of EPG, the vertical direction is the channel axis direction, and different channels are displayed in a plurality of rows. The horizontal direction is the time axis direction. Television programs in each row are arranged in the order of playing time, the size of the display area of each television program represents the playing time length, the start position of the display area represents the start playing point of the program, the end position of the display area represents the end playing point of the program, and the program name is shown in the display area.

It should be noted that program types included in the drawings of the specification are configured to illustrate, and configured to describe the program types of programs. The program types may not be displayed in the display area.

In some embodiments, as shown in FIG. 5A, the range of the EPG in the current user interface is four channels (first to fourth channels), and the television programs of each channel are displayed in a row according to the playing time sequence.

For example, in the television program menu from 22:00 today to 1:00 tomorrow, the television programs of the first channel are program 11, program 12 and program 13 in sequence: the television programs of the second channel are program 21, program 22, program 23 and program 24 in sequence; the television programs of the third channel are program 31, program 32, program 33 and program 34 in sequence.

The user may select different time periods by operating the horizontal time axis, for example, may view different time periods of tomorrow, or a specific date range supported by the program guide application. Similarly, in the case of selecting a fixed time period, the user may view different channels by operating the vertical channel axis, for example, may view the sixth channel or the tenth channel or the like by pulling down the channel axis. Through the presentation of waterfall flow pattern in the user interface of the electronic program guide, the user interface of the electronic program guide can display more supported channels and program information included in the channels as the user scrolls down the channel axis.

In some embodiments, the display is further configured to display other interactive elements while displaying the electronic program guide. The interactive elements may include, for example, television homepage control, search control, message button control, mailbox control, browser control, Favorites control, signal bar control, etc.

In some embodiments, the interactive elements may also be operated by a sensor, which may be, but not limited to, an acoustic input sensor, such as a microphone, that can detect voice commands including an indication of the desired interactive element. For example, the user may use a voice command "launch program guide" to trigger the launch of the electronic program guide application, or any other suitable identifier to identify the desired interactive element, and may also describe the desired action to be performed for the desired interactive element. The controller may recognize voice commands and submit data for instructing the interaction to the UI or the processing component or engine thereof.

Figure 5B:
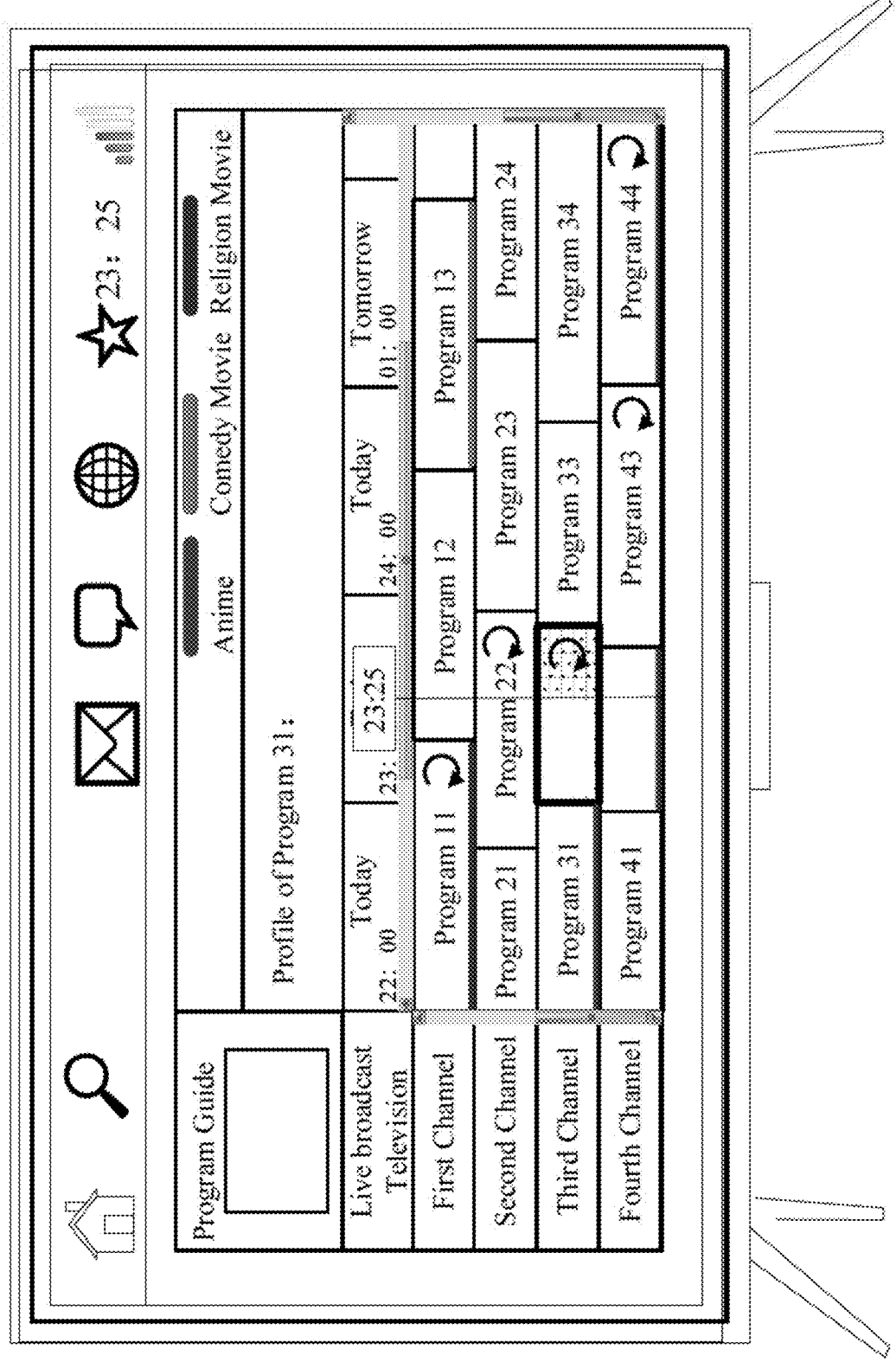
FIG. 5B is a schematic diagram of a user interface of the program guide of the display apparatus according to another embodiment of the disclosure.

FIG. 5B is a schematic diagram of a user interface of the program guide of the display apparatus according to another embodiment of the disclosure.

The display apparatus further includes a first controller. In order to realize the display of a program available for replay in the program guide, the first controller sends a first request for causing an interface of a local program guide to display a replay identifier for the replayable program to the server.

In some embodiments, the first request includes live broadcast information, and the live broadcast information may include information such as channel number, channel name, live broadcast program name, and playing time, etc.

In the live broadcast information, each program has corresponding information such as live broadcast program name, channel number, channel name, playing time, etc. After the first request is sent to the server, the first request is configured to cause the server to determine replay data that can be provided to the display apparatus according to a first live broadcast program included in the live broadcast information.

For example, based on the user interface shown in FIG. 5A, the first request sent from the first controller to the server may include the live broadcast information of 19 live broadcast programs shown in the first channel to the fourth channel in the FIG. 5A, including the live broadcast program name, channel number, channel name, and playing time of each program.

The server determines on the server side according to the live broadcast programs whether media files for replay can be provided to the smart television. For example, when there are media files corresponding to program 11, program 22, program 32, program 43 and program 44 in a media resource library on the server side, the replay data determined by the server may include corresponding media file information for replaying the above live broadcast programs.

In the server of the disclosure, a second controller of the server receives the first request including the live broadcast information sent from the smart television, and the second controller determines a first media file to be used by the display apparatus to realize replay of a first live broadcast program based on the first live broadcast program included in the live broadcast information in the first request.

For example, the live broadcast information in the first request received by the second controller includes 19 live broadcast programs, of which 5 programs, i.e., program 11, program 22, program 32, program 43 and program 44, have media files corresponding to the same content in the media resource library of the server, that is, the user can access the media files that have existed on the server side for network playing, thereby realizing the replay effect of the local live broadcast programs of the television.

After determining whether the live broadcast program included in the first request can be replayed, the second controller adds the replayable programs to the replay data for delivery to the smart television in a one-to-one correspondence. For example, in the replay data, program 11 corresponds to replay 11, program 22 corresponds to replay 22, program 32 corresponds to replay 32, program 43 corresponds to replay 43, and program 44 corresponds to replay 44. It should be noted that, in the replay data, a server-side media file corresponding to a live broadcast program may be realized as a program ID that has existed on the server side, that is, in the replay data, the program ID of the replay 11 corresponding to the program 11 is unique on the server side, and other programs that cannot be replayed do not have the above program IDs that can be recognized on the server side. After determining the replay data, the second controller sends the replay data to the smart television.

In some embodiments, the first controller of the smart television receives the replay data sent from the server. Here, when the live broadcast program has a corresponding media file on the server side, the first controller may control the local program guide to display the live broadcast program including a replay identifier, as shown in FIG. 5B.

For example, in the replay data received by the first controller, the live broadcast programs that have corresponding media files on the server side are: program 11, program 22, program 32, program 43 and program 44, respectively. The first controller may control the user interface of the program guide to add replay identifiers to the above live broadcast programs.

Through the replay identifiers, the user can quickly distinguish many live broadcast programs in the program guide. The live broadcast programs with replay identifiers can be replayed on different user interfaces. For the live broadcast programs without replay identifiers, the user does not need to try to replay, avoiding the user from wasting time due to finding nothing after searching in the video application or from performing invalid searches.

In some embodiments, as shown in FIG. 5B, five programs can be replayed locally in the smart television, that is, the user can trigger the replay on the interface of the program guide or in the playing process of the corresponding live broadcast programs by replaying the above five live broadcast programs. The replay generally means that the smart television accesses the corresponding media files on the server side for playing according to network resources.

For example, the first live broadcast program is program 11, and the first media file with the same content exists in the media resource library of the server, and then the user can access the first media file on the server side through the replay operation during the live broadcast of the program 11, to achieve the local replay function of the program 11.

In some embodiments, in the live broadcast information included in the first request sent from the first controller of the smart television to the server, the live broadcast program information may come from the program guide, and the live broadcast programs may be programs of each channel in different time periods, and for example, may include live broadcast programs at the current moment, live broadcast programs that have ended, or live broadcast programs that have not started.

For example, in FIG. 5B, the current point is 23:25, the first controller of the smart television obtains the replay data after sending the first request, and the replayable live broadcast programs in the program guide include program 22 and program 32 at the current moment. Although the live broadcast of program 11 has ended before the current moment, the program 11 can still be replayed. The live broadcasts of program 43 and program 44 have not started, and the program 43 and program 44 are displayed as replayable in the user interface because the server determines that media files with the same content exist in the server according to the program names of the two programs.

It should be noted that, for a live broadcast program that has not yet started, in some embodiments, the smart television configures the live broadcast program so that the user can perform a replay operation before the live broadcast program starts, that is, a disguised on-demand operation. In some embodiments, the smart television configures the live broadcast program that has not yet started to be replayed only after the live broadcast starts.

Figure 5C:
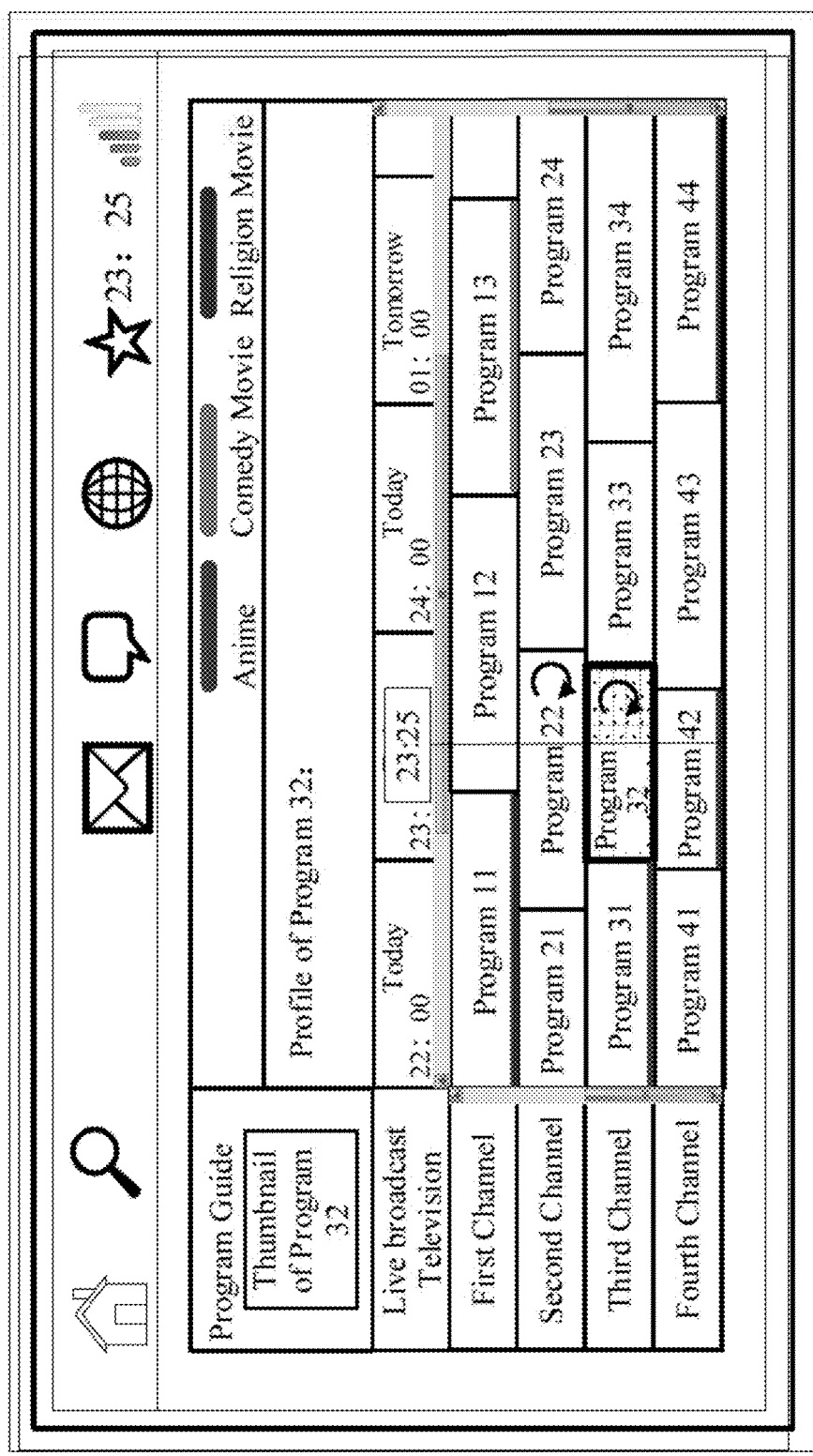
FIG. 5C is a schematic diagram of a user interface of the program guide of the display apparatus according to another embodiment of the disclosure.

FIG. 5C is a schematic diagram of a user interface of the program guide of the display apparatus according to another embodiment of the disclosure.

In some embodiments, after the first controller of the smart television receives the replay data sent from the server, the first controller determines the live broadcast programs of all channels in the program guide at the current moment. Based on the obtained replay data, the first controller controls the live broadcast programs in the program guide of the user interface to display replay identifiers.

For example, the programs that the server can support for replay include program 11, program 22, program 32, program 43 and program 44. The first controller, based on the replay data, screens the programs to obtain the program 22 and program 32 in live broadcast among the above five programs; and then the first controller controls the program 22 and program 32 in the program guide to display replay identifiers, while the other three replayable programs do not display replay identifiers, as shown in FIG. 5C. In this way, the implementations of replay and on-demand can be distinguished, which fits the user's viewing habits better in some scenarios.

In some embodiments, the first controller determines the live broadcast information sent to the server based on a local channel list after the smart television starts. For example, in the live broadcast mode, the local channel list can generally display the television programs played by all channels at the current moment. Therefore, when the first controller obtains the live broadcast information based on the local channel list, the live broadcast information includes information about all live broadcast programs played by all playable channels of the smart television at the current moment.

Therefore, after the server receives the first request including the program information at the current moment, the second controller of the server determines whether there are media files corresponding to live broadcast programs currently being played by the playable channel of the smart television. After the first controller receives the replay data sent from the server, the first controller may control the local channel list of the smart television to display the live broadcast programs including replay identifiers.

In this embodiment, the live broadcast information sent from the smart television only relates to television programs being played, and program objects determined by the server are limited to the programs being played by the smart television, thereby increasing the processing speed of the server, reducing the amount of data transmission between the server and the smart television, and increasing the display speed of replayable programs in the channel list of the smart television.

Figure 5D:
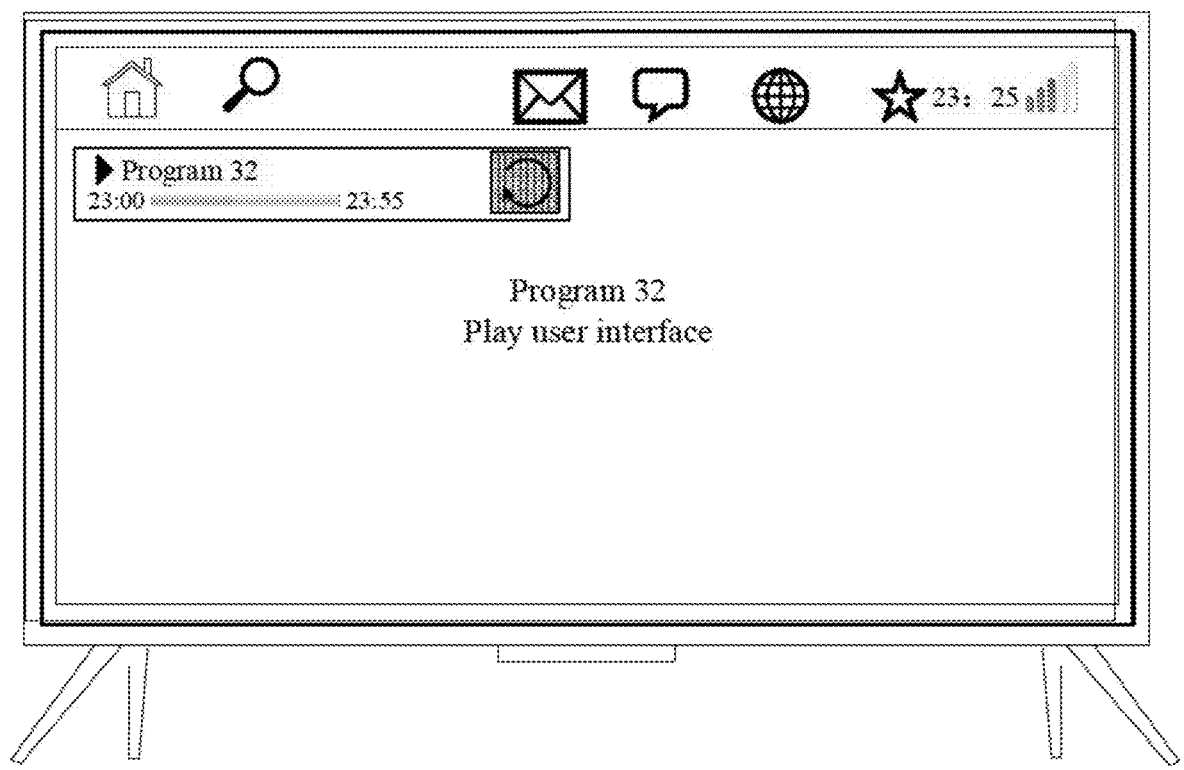
FIG. 5D is a schematic diagram of a user interface of a live broadcast program of the display apparatus according to an embodiment of the disclosure.

FIG. 5D is a schematic diagram of a user interface of a live broadcast program of the display apparatus according to an embodiment of the disclosure.

In some embodiments, when the first live broadcast program can be replayed on the smart television, information bar during the live broadcast may include a replay control which is configured to cause the first controller to control the user interface to play the corresponding first media file on the server side after receiving a confirmation operation from the user.

For example, during the live broadcast of the program 32, the operation of the remote control may make the user interface display the information bar of the program 32, including the program name, live broadcast start time, live broadcast end time, live broadcast progress, and the replay control in the information bar.

In some embodiments, after the user clicks the replay control in the information bar of the live broadcast program, the first controller will send a second request including identifier information of the first media file to the server.

For example, the live broadcast program in the replay data received by the smart television includes the corresponding server-side media file ID. Then, the second request may include the first media file ID as the identifier information, so that the server generates a playing address accessible via the smart television.

Correspondingly, after receiving the second request including the identifier information of the first media file sent from the smart television, the second controller of the server determines the playing address of the first media file according to the identifier information of the first media file, that is, the server can determine the playing link quickly on the server side according to the first media file ID, or the server can determine the playing address of the first media file according to the name of the first media file sent from the smart television or other identifiable information.

The second controller of the server sends the playing address to the smart television, and the first controller receives the playing address and plays the first media file on the user interface of the smart television according to the playing address, realizing the replay function of the live broadcast program.

Figure 5E:
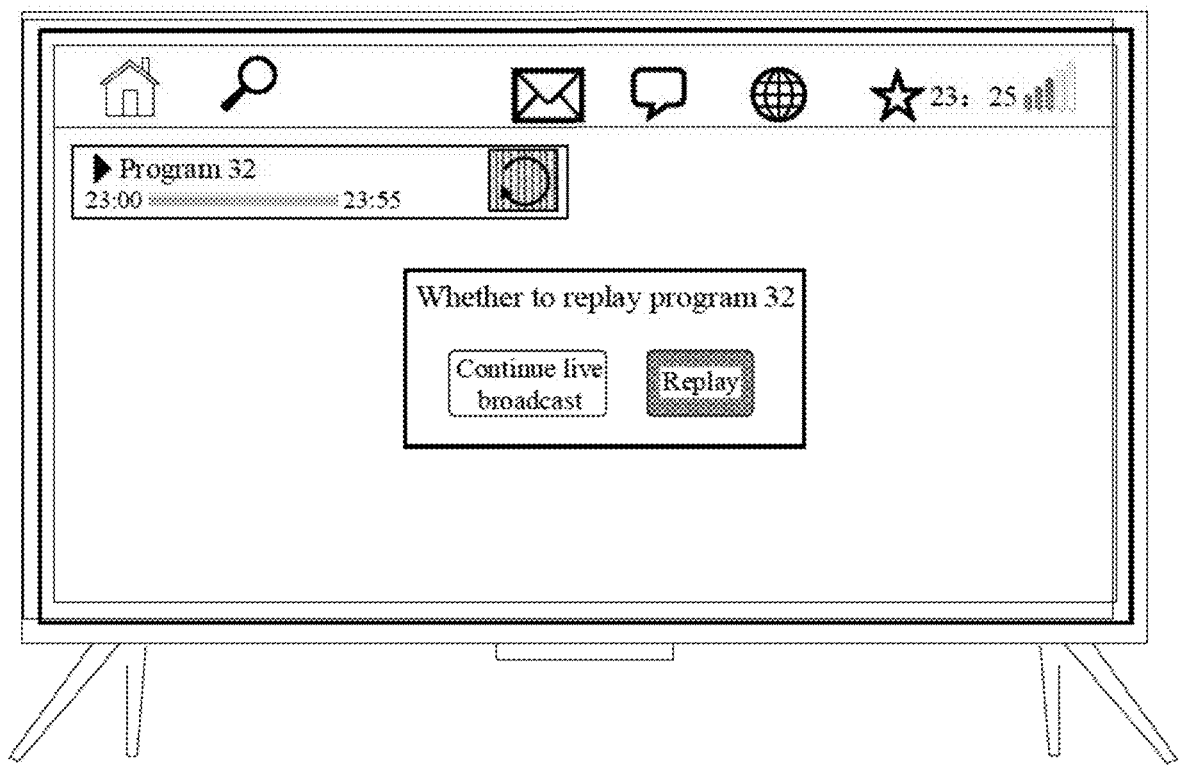
FIG. 5E is a schematic diagram of a user interface of a live broadcast program of the display apparatus according to another embodiment of the disclosure.

In some embodiments, after the replay control receives the user's confirmation operation, the first controller may further control the user interface to display a confirmation prompt to prompt the user whether to replay or continue the live broadcast, as shown in FIG. 5E.

Figure 6:
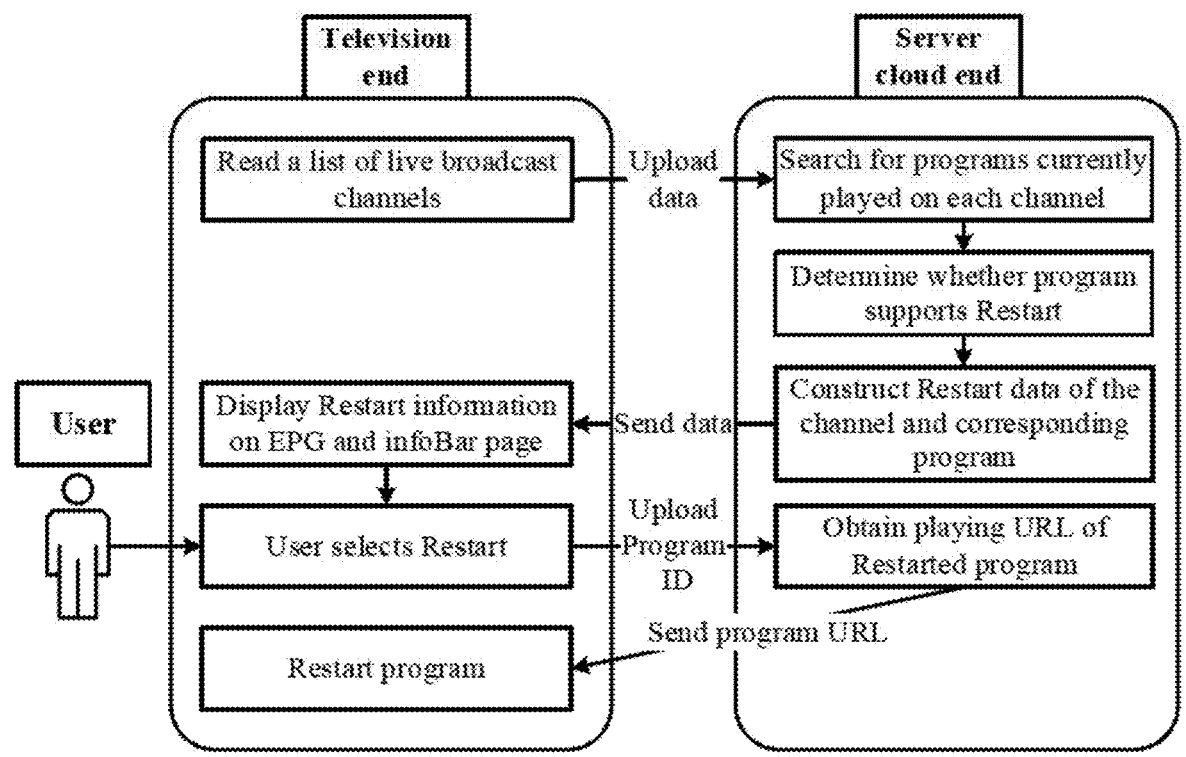
FIG. 6 is a logic schematic diagram of implementing replay control of a live broadcast television program according to an embodiment of the disclosure.

FIG. 6 is a logic schematic diagram of implementing replay control of a live broadcast television program according to an embodiment of the disclosure.

In some embodiments, the smart television reads a list of live channels at the current moment, encodes the list, and uploads the encoded list to the cloud server. After receiving the list of live channels, the cloud server searches the media resource library for the live broadcast program currently being played on each channel to determine whether each live broadcast program supports replay (Restart).

After determining the replayable live broadcast programs, the server constructs Restart data of corresponding live broadcast programs on the television channels, and sends the Restart data to the smart television. After receiving the replay data (Restart data), the smart television matches Restart information of replayable programs with information of the live broadcast program currently being played.

If Restart information of a replayable program matches with information of the live broadcast program currently being played and the live broadcast program supports Restart playing, the EPG (Electronic Program Guide) and infoBar (information bar) page are controlled to display a Restart (replay) identifier to remind the user that the current live broadcast program supports the Restart playing function, and provide function buttons and controls for the user to select.

After the user selects a live broadcast program for Restart viewing, the smart television can upload a unique program ID of the program to a cloud server to obtain playing URL (address) of the replayable program. After receiving the program ID, the cloud server searches the program content library for the playing URL of the program and sends the URL to the smart television. After obtaining the URL successfully, the smart television accesses the playing address to play through the player, to start playing the program for the user to watch.

The smart television sends live broadcast channel information of the television to the cloud server. After receiving the information, the server searches the program library for the information of the currently-played program corresponding to the channel, and determines whether the program supports Restart; then the server sends the channel information and program Restart information to the smart television. After receiving the data, the smart television compares the program Restart information with the current program information in the EPG and infoBar, if the two programs are a same program and support the Restart function, the Restart icon will be displayed on the user interface to remind the user that the current program supports Restart watching, and a button is provided for the user to watch with one click.

When the user selects to watch with one click, the smart television acquires the playing URL from the cloud server according to the Restart program ID. After successful acquisition, the player can be opened for playing, and finally the user can easily watch the program from the beginning.

The display apparatus of the disclosure can directly display to the user whether the current program supports Restart on the EPG page and the infoBar page; and if the current program supports Restart, the user is provided with a watch button, and the user can watch from the beginning with one click, greatly simplifying the user operation and improving the use experience of the user.

The disclosure further provides a control method for playing a live broadcast program of a television applied to a display apparatus. The method includes: sending a first request including live broadcast information to a server, where the first request is configured to cause the server to determine replay data that can be provided according to a first live broadcast program included in the live broadcast information, and the replay data includes a first media file for replaying the first live broadcast program; and receiving replay data sent from the server, and controlling the electronic program guide to display the first live broadcast program including a replay identifier when the replay data includes the first media file; where an information bar includes a replay control during live broadcast of the first live broadcast program, and the replay control is configured to trigger playing the first media file after receiving a confirmation operation from a user.

In an embodiment of the disclosure, the local program information can be sent to the server by constructing the first request including the live broadcast information; further, it can be determined whether the local program has media resources on the server side by constructing the replay data including the first media file; and further, the user can quickly distinguish replayable programs in the program guide by constructing the replay identifier, avoiding the user's invalid search for programs that cannot be replayed in the program guide, realizing replay with one click, and simplifying user's operations.

The Electronic Program Guide (EPG for short) is also called electronic program menu, which refers to channels and broadcast program information of the channels displayed in a two-dimensional mode on the user interface of the display apparatus. Generally, EPG information is sent along with a broadcast signal, so the EPG information can be extracted by a decoder from the broadcast signal (also called transport stream) received by a tuning demodulator.

Figure 8:
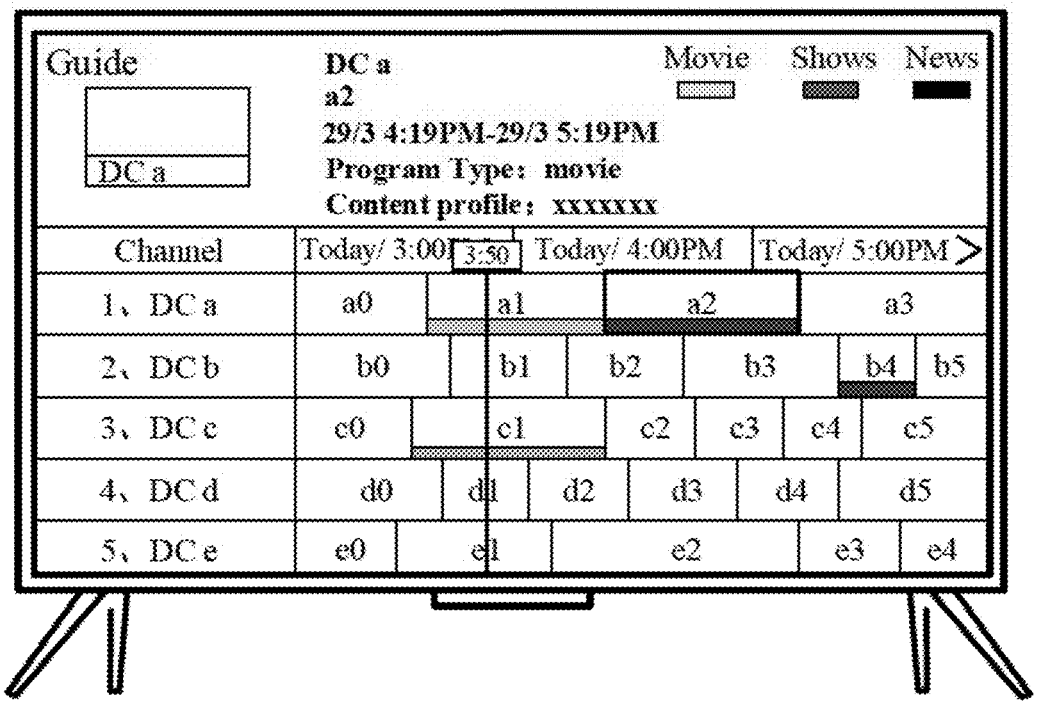
FIG. 8 is an interface of an electronic program guide according to some embodiments.

FIG. 8 is an interface of an EPG shown in an embodiment of the disclosure. As shown in FIG. 8, the channels are arranged in a plurality of rows from top to bottom in the vertical direction; and the horizontal direction is the time axis direction, where broadcast programs of each channel are arranged and displayed in a row according to the program playing time order, the broadcast programs in each row are arranged in the program playing time order, and the size of the display area of each broadcast program represents the broadcast duration thereof, the start position of the display area of the broadcast program represents the start playing moment of the broadcast program, the end position represents the end playing point of the broadcast program, and the program name is displayed in the display area. For example, in the user interface of the EPG shown in FIG. 8, there is a broadcast program menu of five channels (DC a-DC e) between 3:00 PM and 5:00 PM, including: broadcast programs a0-a3 of channel DC a, broadcast programs b0-b5 of channel DC b, broadcast programs c0-c6 of channel DC c, broadcast programs d0-d8 of channel DC d, and broadcast programs e0-e7 of channel DC e.

As can be seen, in order to display as many channels and broadcast program information thereof as possible in the user interface at the same time, the size of the display area of the broadcast program and the size of the program name displayed in the area are relatively small, but such EPG display mode is not beneficial for a specific group of people with vision defects (such as senior citizens with deterioration of vision or the visually impaired) to watch the program information.

The EPG can generally be displayed on the display apparatus in the form of user interface, so that the user can use the electronic program menu provided by the EPG to view the program information (such as program content introduction, introduction of actors and directors, etc.) of each channel, or schedule to record a future program, etc. The broadcast programs of channels are generally arranged and displayed in the form of two-dimensional matrix on the user interface of the EPG, and the display areas of the broadcast programs are displayed in size proportional to the broadcast durations of the broadcast programs.

In some embodiments, the EPG information is sent along with the broadcast signal, so the EPG information can be extracted by a decoder from the broadcast signal (also called transport stream) received by a tuning demodulator. Referring to FIG. 3, the tuning demodulator 210 receives a broadcast signal, the decoder (not shown in the figure) extracts the broadcast EPG information from the received broadcast signal and outputs the extracted broadcast EPG information to the internal bus, and the controller 250 stores the broadcast EPG information output to the internal bus in memory for display of the EPG user interface.

The above-mentioned broadcast signal is also called Transport Stream (TS) signal, and the data part different from the audio/video part in the TS signal is reconstructed to form a program information table. The program information table includes Program Association Table (PAT), Program Mapping Table (PMT), Network Information Table (NIT). Event Information Table (EIT) and other broadcast program information. The broadcast EPG information is stored in the EIT, including the start playing time and end playing time of the broadcast program, as well as a plurality of descriptor fields, for example, a short event descriptor field that identifies the program name of the broadcast program, an extended event descriptor field that identifies lead actors, scriptwriter, profile, etc. of the broadcast program, a component descriptor field that identifies the program type of the broadcast program, a short event descriptor field and an extended event descriptor field that identify the language in which the broadcast program is displayed, and so on.

Figure 7:
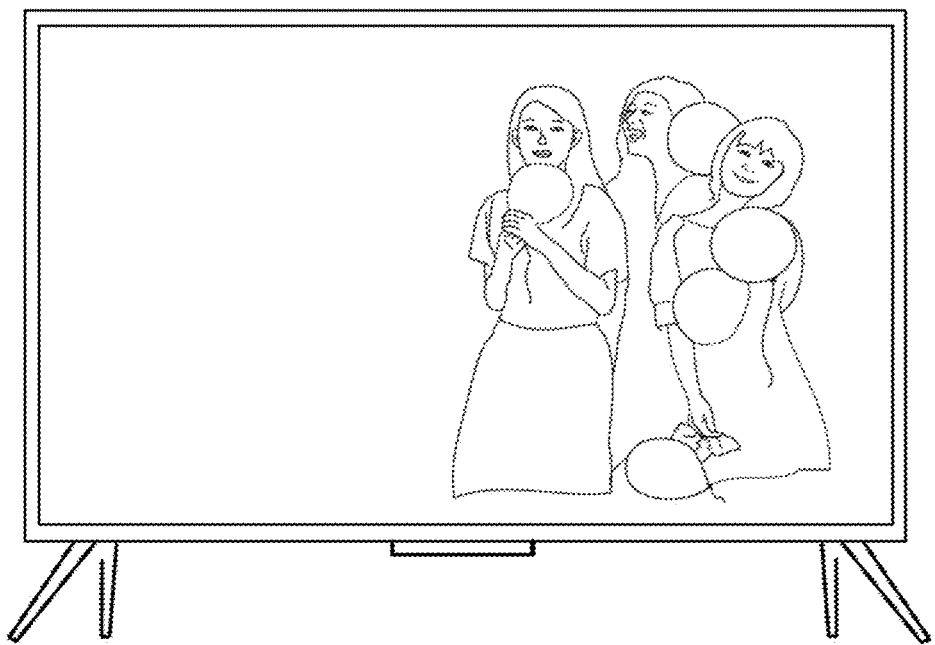
FIG. 7 is a picture of a broadcast program according to some embodiments.

FIG. 7 is a picture of a broadcast program shown in an embodiment of the disclosure. When the display shows the picture of the broadcast program as shown in FIG. 7, the user inputs a command for displaying the EPG to the controller 250 through the user interface (for example, pressing a button on the remote control). In response to the command input from the user, the controller 250 reads the EPG information from the memory, so that the EPG generator (not shown in the figure) can construct a user interface of the EPG based on the read broadcast EPG information, and then the constructed user interface of the EPG is displayed on the display through the video processor.

FIG. 8 is an interface of an EPG shown in an embodiment of the disclosure. As shown in FIG. 8, the channels are arranged in a plurality of rows from top to bottom in the vertical direction; and the horizontal direction is the time axis direction, where broadcast programs of each channel are arranged and displayed in a row according to the program playing time order, the broadcast programs in each row are arranged in the program playing time order, and the size of the display area of each broadcast program represents the broadcast duration, the start position of the display area of the broadcast program represents the start playing time point of the broadcast program, the end position of the display area represents the end playing time point of the broadcast program, and the program name is displayed in the display area. For example, in the user interface of the EPG shown in FIG. 8, there is a broadcast program menu of five channels (DC a-DC e) between 3:00 PM and 5:00 PM, including: broadcast programs a0-a3 of channel DC a, broadcast programs b0-b5 of channel DC b, broadcast programs c0-c6 of channel DC c, broadcast programs d0-d8 of channel DC d, and broadcast programs e0-e7 of channel DC e.

When a selector (an element for displaying the position of the focus on the interface) falls into the display area of a broadcast program, the guide of the broadcast program is simultaneously displayed on the user interface of the EPG. The guide of the broadcast program may include the channel ID, the playing time (the start and end playing moments), the program type and the content introduction, etc. of the broadcast program. As shown in FIG. 8, when the selector falls in the display area of the broadcast program a2, the channel identifier DC a of the channel to which the broadcast program a2 belongs, the playing time "4:19 PM-5:19 PM" of the broadcast program a2, the program type "movie" of the broadcast program a2 and the content introduction of the broadcast program a2 are displayed in the guide area located on the upper side of the EPG user interface.

In some embodiments, the display form of the EPG is not limited to the form shown in FIG. 8. The user can set the display mode of the EPG based on the interaction with the display apparatus. The display apparatus can assign a value to the specified flag bit in the system file according to the EPG display mode set by the user. When receiving an input instruction for displaying the electronic program guide, the display apparatus obtains the current preset EPG display mode according to the value of the specified flag bit, and then displays the interface of the electronic program guide in the corresponding form according to the EPG display mode preset by the user, where the interface of the electronic program guide corresponding to different EPG display modes has different display forms or styles.

In some embodiments, a setting entrance of the EPG display mode is provided in the setting function (Setting-Accessibility) of the display apparatus, and this entrance may also be referred to as a barrier free setting entrance for electronic program guide (Accessible Guide). The user can enter the setting interface of EPG display modes by clicking this entrance. A plurality of EPG display mode options are displayed in the setting interface of EPG display modes. When the user selects an option, the EPG display mode corresponding to this option may be determined as the preset EPG display mode, and the display apparatus assigns a value to the specified flag bit in the system file according to the determined EPG display mode.

Figure 9:
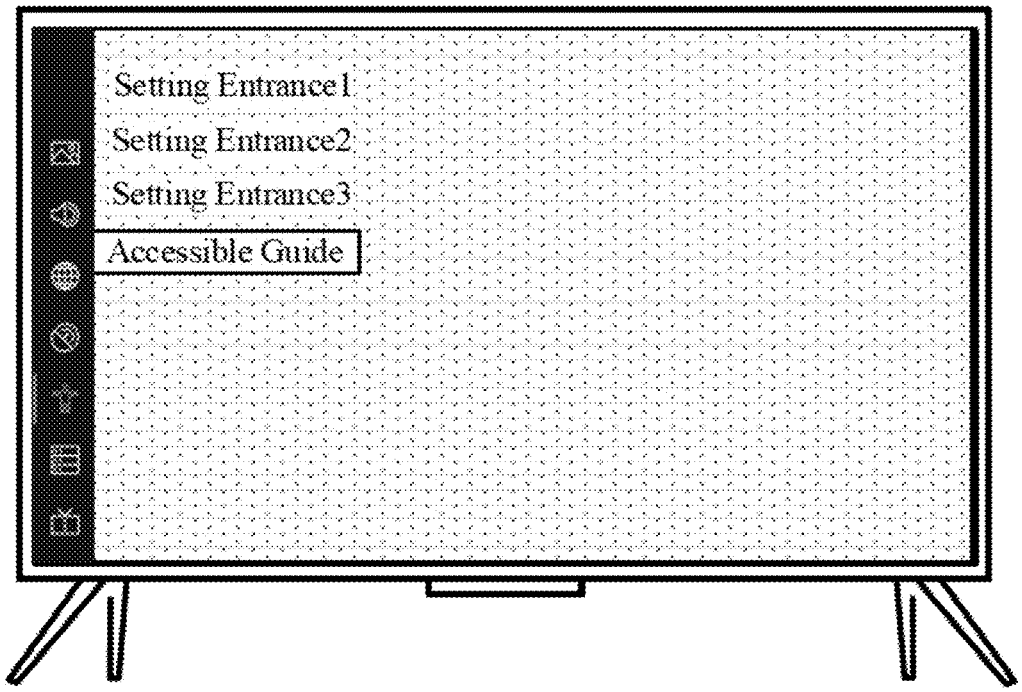
FIG. 9 is a setting interface of a display apparatus according to some embodiments.

FIG. 9 is a setting interface of the display apparatus shown in some embodiments of the disclosure, which may be an interface displayed after a user opens a setting application in the display apparatus. As shown in FIG. 9, the setting interface includes a plurality of setting items, such as a setting entrance for electronic program guide (Accessible Guide). The user can select the entrance by moving the selector. When the selector selects the entrance, the OK button on the remote control may be pressed to control the display apparatus to display the setting interface of EPG display modes.

Figure 10:
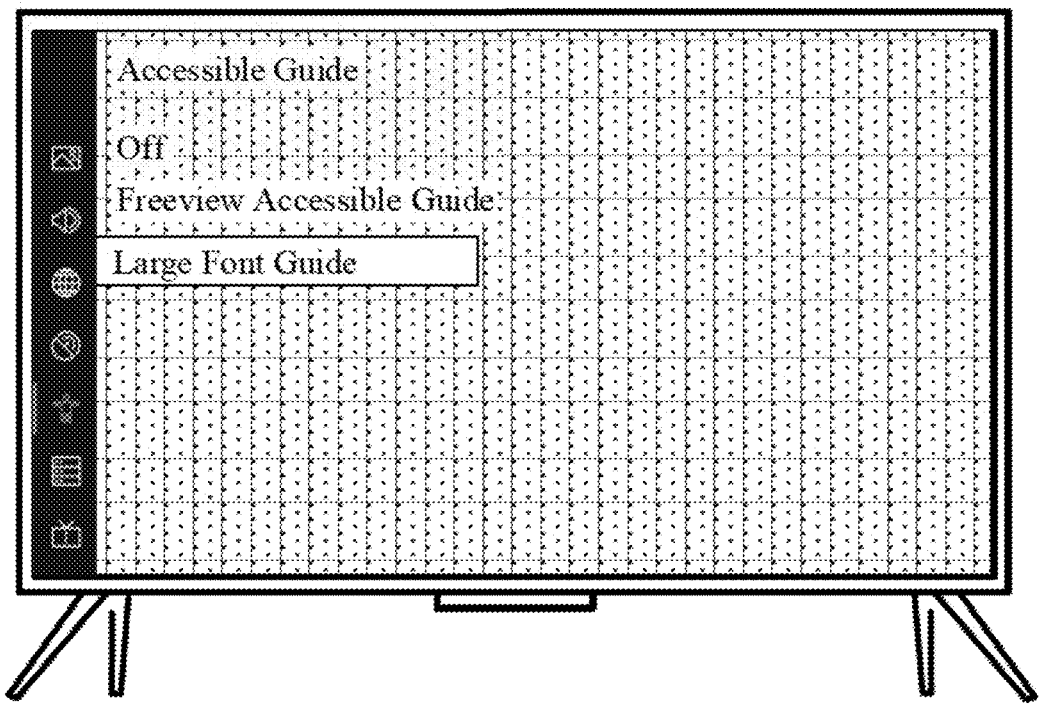
FIG. 10 is a setting interface of EPG display modes according to some embodiments.

FIG. 10 is a setting interface of EPG display modes shown in some embodiments of the disclosure, which may be an interface entered after the user operates the setting entrance for electronic program guide (Accessible Guide) in FIG. 9. As shown in FIG. 10, the setting interface of EPG display modes includes a plurality of EPG display mode options, such as Large Font Guide, Freeview Accessible Guide, and Off. In an example shown in FIG. 10, the mode option selected by the user is the option Large Font Guide. This means that the preset EPG display mode at this time is the Large Font Guide mode. It should be understood that, when the option Off is selected, this case indicates that the preset EPG display mode is the normal mode. The interface of the electronic program guide displayed in the normal mode may be the interface of the EPG shown in FIG. 8.

In some embodiments, the Large Font Guide mode is referred to as the first mode, and the Freeview Accessible Guide mode and normal mode are referred to as other modes.

In some embodiments, the Large Font Guide mode is referred to as the first mode, and the normal mode is referred to as the second mode. Forms and/or styles of the interfaces of the electronic program guide corresponding to the first mode and the second mode are different. For convenience of description, the interface of the EPG corresponding to the first mode is referred to as the first interface of the electronic program guide, and the interface of the EPG corresponding to the second mode is referred to as the second interface of the electronic program guide.

In some embodiments, the first interface of the electronic program guide includes a channel list and a program list of a currently selected channel, and the program list of the currently selected channel includes program information arranged vertically according to the program playing time. The second interface of the electronic program guide includes a channel list and a program list of each channel, and the program list of each channel includes program information arranged horizontally according to the program playing time. It's worth noting that the display size of the program information displayed in the first mode is larger than the display size of the program information displayed in the second mode. It should be noted that the display size of the program information includes at least the font size of the text, and may also include the size of the display area.

The second interface of the electronic program guide may be the interface of the EPG as shown in FIG. 8.

Figure 11:
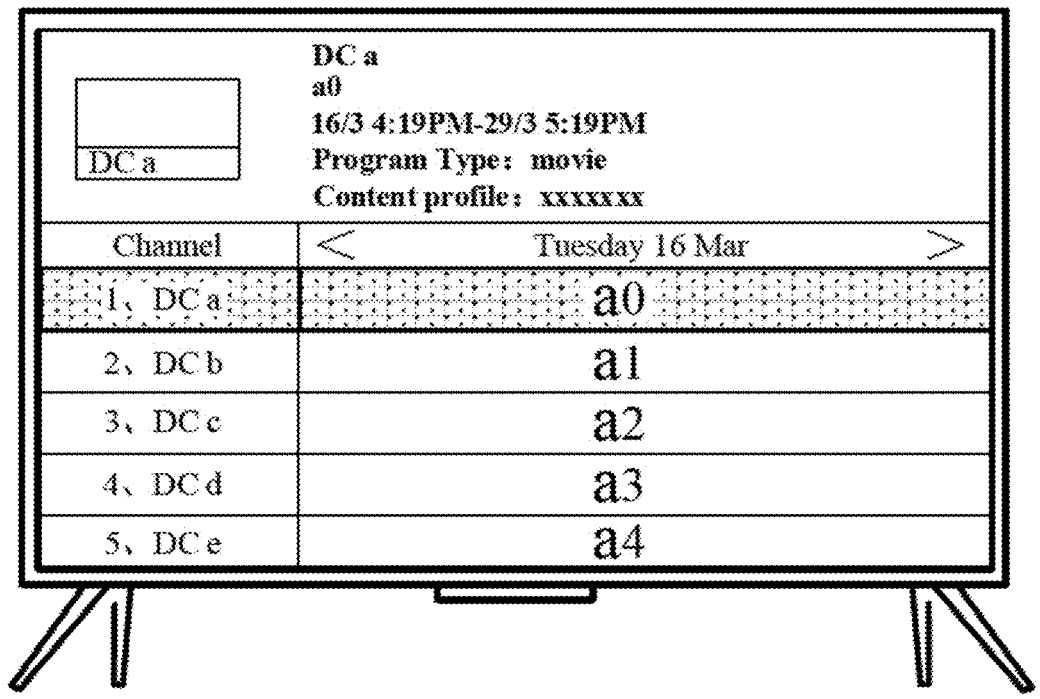
FIG. 11 is a first interface of an electronic program guide according to some embodiments.

FIG. 11 is a first interface of an electronic program guide shown in some embodiments of the disclosure, that is, the interface of the electronic program guide displayed when the preset EPG display mode is the first mode (Large Font Guide). As shown in FIG. 11, the interface of the electronic program guide includes a first content area on the left side of the interface, a second content area on the right side of the first content area, and a third content area located above the first content area and the second content area. In the vertical direction of the first content area, channels are sequentially arranged in rows from top to bottom to form a channel list, and a certain channel in the channel list is in a selected state. For example, in FIG. 11, the channels DC a-DC e are arranged in rows, or DC a-DC e are arranged vertically in the first content area, and the selector stays on DC a, that is, DC a is in the selected state. In the vertical direction of the second content area, program information of programs of the currently selected channel is arranged in the order of program playing time to form a program list, and each piece of program information forms a separate row, where the program information is displayed as program name. Moreover, the top row of the second content area is configured to display the time period to which the playing time of the program information belongs. For example, in FIG. 11, programs a0-a4 of the channel DC a played on "Tuesday 16 March" are displayed vertically from top to bottom in the order of playing time, and each piece of program information has the same display area, that is, the size of each row in the second content area. When the selector falls into the display area of the certain program information, the guide of the broadcast program is displayed in the third content area. The guide of the broadcast program may include the channel ID, the playing time (the start and end playing moments), the program type and the content introduction, etc. of the broadcast program. As shown in FIG. 11, when the selector falls in the display area of the broadcast program a0, the channel identifier DC a of the channel to which the program a0 belongs, the broadcast time "4:19 PM-5:19 PM" of the program a0, and the program type "movie" are displayed in the third content area on the upper side of the interface.

As can be seen in FIG. 8 and FIG. 11, the display area of the program information in the first interface of the electronic program guide is larger than the display area of the program information in the second interface of the electronic program guide, and simultaneously, the font size of the program name in the first interface of the electronic program guide is larger than the font size of the program name in the second interface of the electronic program guide.

Based on the display apparatus according to embodiments of the disclosure, a specific group of people with vision defects, such as the senior citizens with degeneration of vision or the visually impaired, can watch the first interface of the electronic program guide as shown in FIG. 11 by presetting the display mode of the EPG as the first mode (Large Font Guide). Compared with the interface of the electronic program guide in other modes, the display size of the program information in the first interface of the electronic program guide is larger, and then the display effect is more prominent, so it is more beneficial for the specific group of people with vision defects to accurately obtain the program information, improving the user experience. The group of people with normal vision can watch the second interface of the electronic program guide as shown in FIG. 8 by presetting the display mode of the EPG as another mode, such as the normal mode. Compared with the interface of the electronic program guide in the first mode, the second interface of the electronic program guide can display more program information at the same time, thereby satisfying the user's requirements for the richness of the program information and the acquisition efficiency of the program information.

In some embodiments, in addition to differences described in the above embodiment, the differences between the first interface of the electronic program guide and the second interface of the electronic program guide also include differences between other display parameters, such as contrast, background color of display area, text color, text weight, font, etc. By designing the appropriate display parameters, the display effect of the program information in the first interface of the electronic program guide is made more prominent, to facilitate watching for people with vision defects.

Figure 12:
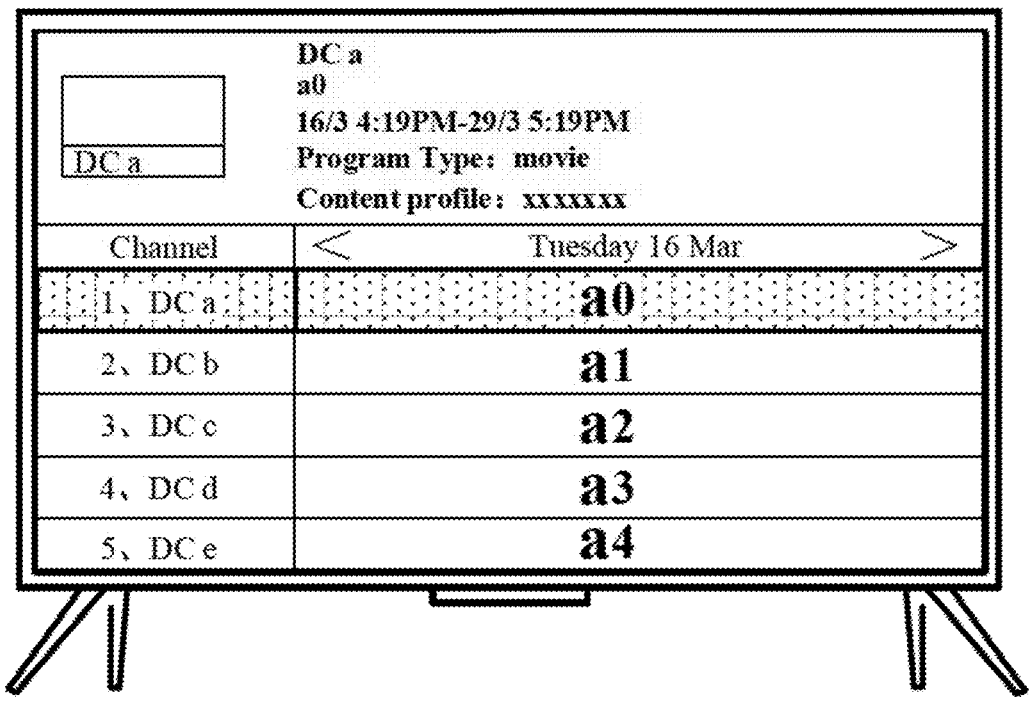
FIG. 12 is another first interface of an electronic program guide according to some embodiments.

FIG. 12 is another first interface of an electronic program guide shown in some embodiments of the disclosure. As shown in FIG. 12, the interface is different from the interface shown in FIG. 11 in that the fonts of the programs a0-a4 in FIG. 12 are bold, and the overall contrast of the interface is larger.

When the first interface of the electronic program guide shown in FIG. 11 or FIG. 12 is displayed, the user can move the selector to a certain channel in the channel list by inputting an operation for moving the focus position. When the selector stays on a channel, the user can select other channels by moving the focus up or down. When the currently selected channel changes from a first channel to a second channel, the program list displayed in the interface is updated from the program list corresponding to the first channel to the program list corresponding to the second channel. When the user operates the focus to continue moving down from the current last channel, all the currently displayed channels will move up one row as a whole, and then the currently displayed first channel disappears in the interface while the next channel of the current last channel will appears in the last row. When the user operates the focus to continue moving up from the current first channel, all the currently displayed channels will move down one row as a whole, and then the currently displayed last channel disappears in the interface while the previous channel of the current first channel will appear in the first row. It should be understood that the aforementioned last channel refers to the channel located in the last row in the channel list displayed on the current interface, such as channel DC e in FIG. 11; and the first channel refers to the channel located in the first row in the channel list displayed on the current interface, such as channel DC a in FIG. 11.

When the first interface of the electronic program guide shown in FIG. 11 or FIG. 12 is displayed, the user can move the selector to a certain piece of program information in the program list by inputting an operation for moving the focus position. When the selector stays on a certain piece of program information, the user can select other piece of program information by moving the focus up or down. When the user operates the focus to continue moving down from the current last row of program information, all the currently displayed program information will move up one row as a whole, and then the currently displayed first row of program information disappears in the interface while the next program information of the current last row of program information will appear in the last row. When the user operates the focus to continue moving up from the current first row of program information, all the currently displayed program information will move down one row as a whole, and then the currently displayed last row of program information disappears in the interface while the program information before the current first row will appear in the first row.

In some embodiments, when the first interface of the electronic program guide is displayed, and when a certain piece of program information in the program list is selected, the program information text corresponding to the program information is acquired, and the program information text is read by voice, where the program information text corresponding to each piece of program information includes but is not limited to program name, and may also include, for example, program playing time, program type, program content introduction, etc. Referring to FIG. 11, when the program information a0 is in the selected state, the display apparatus reads the program name "a0" by voice. As can be seen, by reading out the relevant information of the program where the focus is located, the user with visual defects can accurately know the information of the currently selected program by hearing, and the user experience is fine.

In a specific implementation, when the first interface of the electronic program guide is displayed, the controller of the display apparatus, in response to a user's selection operation on a certain piece of program information, generates a program information text corresponding to the program information according to fields related to the program information in the EPG information, invokes the Text to Speech (TTS) service pre-configured in the system, and reads the above program information text through the Text to Speech (TTS) service.

Figure 13:
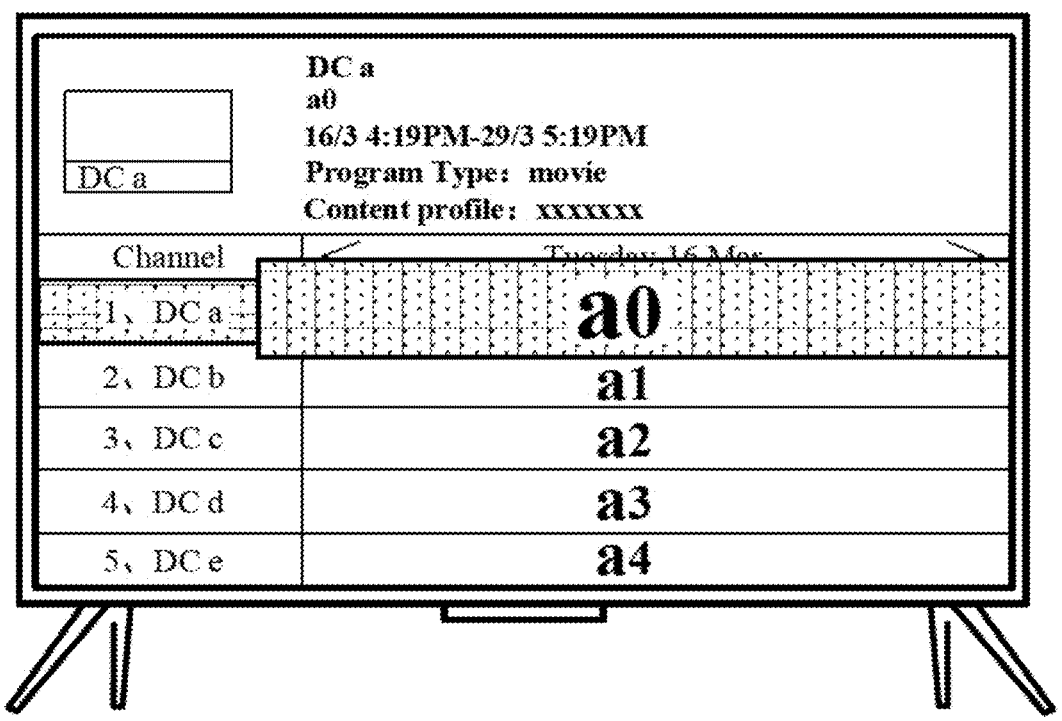
FIG. 13 is another first interface of an electronic program guide according to some embodiments.

In other embodiments, when the first interface of the electronic program guide is displayed and when a certain piece of program information in the program list is selected, the program information is highlighted according to a preset rule. The preset rule is an adjustment rule for at least one display style, for example, an enlargement rule for the display area of the program information, a style adjustment rule for characters included in the program information, etc. FIG. 13 is another first interface of an electronic program guide shown in some embodiments of the disclosure. As shown in FIG. 13, different from the interface shown in FIG. 11, the program a0 is in the selected state in this interface, so the display area and the program name corresponding to the program a0 are enlarged for display.

In some embodiments, the first interface of the electronic program guide includes interactive controls for adjusting the time period of the program list. The user can input a time period adjustment command by operating such an interactive control. In response to a command for adjusting the time period, the display apparatus determines an adjusted time period, and updates the program list of the currently selected channel according to the adjusted time period, to present a part or all of the program information in the adjusted time period in the first interface of the electronic program guide.

Referring to FIG. 11, a first time adjustment control and a second time adjustment control are respectively displayed on the left and right sides of the program time period information "Tuesday 16 March" in the first interface of the electronic program guide. Here, the user can input a first time period adjustment command by operating the first time adjustment control, where the first time period adjustment command is configured to move the program time forward, for example, from "Tuesday 16 March" to "Monday 15 March". In this case, the program list displayed in the interface will change from the program list played by the channel DC a in "Tuesday 16 March" to the program list played by the channel DC a in "Monday 15 March". The user can input a second time period adjustment command by operating the second time adjustment control, where the second time period adjustment command is configured to move the program time backward, for example, from "Tuesday 16 March" to "Thursday 17 March". In this case, the program list displayed in the interface will change from the program list played by the channel DC a in "Tuesday 16 March" to the program list played by the channel DC a in "Thursday 17 March".

In some embodiments, the program list displayed in the first interface of the electronic program guide comprises a part of the program information corresponding to the currently selected channel, this part of the program information is screened out by the display apparatus from all program information of the currently selected channel in a certain time period, and the screening rule may be a pre-configured rule. For example, according to the label information pre-selected by the user, the program information matching with the label information is screened out from all the program information of the currently selected channel in a certain time period.

In a specific implementation, an entrance for entering the label selection interface is provided in the first interface of the electronic program guide, so that the user enters the label selection interface based on the entrance. The label selection interface includes a plurality of label information options, and the user can select the label information for screening out the program information by checking one or more label information options. The display apparatus records one or more label information after receiving the selection operation of one or more label information options input from the user in the label selection interface. Further, when the display apparatus displays the first interface of the electronic program guide, firstly the program information matching with the label information is screened out from all the program information corresponding to the currently selected channel according to the one or more label information recorded, and finally the screened-out program information is displayed in the first interface of the electronic program guide in the order of playing time, to form a program list corresponding to the currently selected channel.

Figure 14:
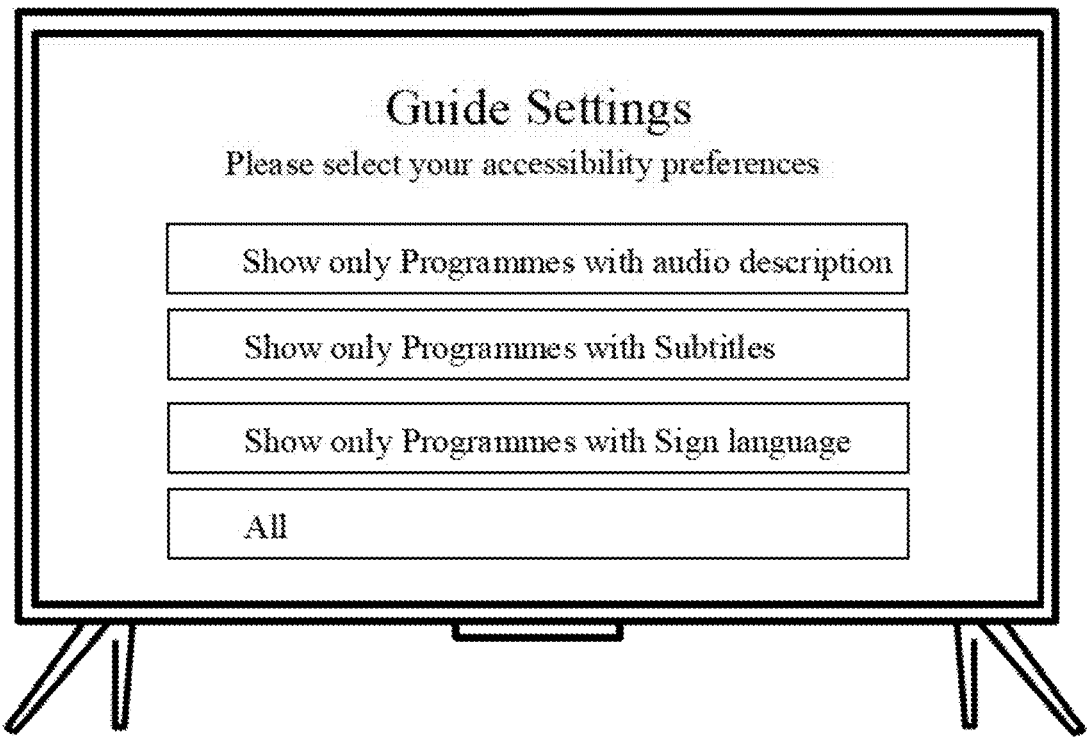
FIG. 14 is a label selection interface according to some embodiments.

Referring to FIG. 14, the first interface of the electronic program guide displays a setting control (Settings), that is, an entrance for entering the label selection interface. When the user operates the control, the user will enter the label selection interface.

FIG. 14 is a schematic diagram of a label selection interface shown in some embodiments of the disclosure. As shown in FIG. 14, the interface includes a plurality of label information options, respectively: "Show only Programmes with audio description", which means "only programmes with audio description are shown"; "Show only Programmes with Subtitles", which means "only programmes with subtitles are shown"; "Show only Programmes with Sign language", which means "only programmes with sign language are shown". In addition, the interface includes an option "All", which, when selected, means that all of the above label options are selected.

Based on the label selection interface shown in FIG. 14, when "Show only Programmes with audio description" is selected, the display apparatus needs to screen out the program information with audio description from all the program information corresponding to the currently selected channel, to display the program information with audio description in the order of playing time in the first interface of the electronic program guide. When "Show only Programmes with Subtitles" is selected, the display apparatus needs to screen out the program information with subtitles from all the program information corresponding to the currently selected channel, to display the program information with subtitles in the order of playing time in the first interface of the electronic program guide. When "Show only Programmes with Sign language" is selected, the display apparatus needs to screen out the program information with sign language from all the program information corresponding to the currently selected channel, to display the program information with sign language in the order of playing time in the first interface of the electronic program guide.

It should be understood that the label information options listed above are only examples, and other label information may also be included, which is not limited in embodiments of the disclosure.

In a specific implementation, the display apparatus determines whether the program information matches with the label information by determining whether the relevant descriptor field in the program information matches with the label information. For example, for the label information "Show only Programmes with audio description", it is necessary to determine a descriptor field configured to identify the audio description information in the program information. If the descriptor field displays the audio description, then it is determined that the program information matches with the label information "Show only Programmes with audio description"; otherwise, it is determined that the program information does not match with the label information "Show only Programmes with audio description". For another example, for the label information "Show only Programmes with Subtitles", it is necessary to determine a descriptor field configured to identify the subtitle information in the program information. If the descriptor field displays subtitles, then it is determined that the program information matches with the label information "Show only Programmes with Subtitles"; otherwise, it is determined that the program information does not match with the label information "Show only Programmes with Subtitles".

As can be seen from the above embodiments, by using the label information selected by the user to screen the program information, the program information matching with the label information is displayed in the first interface of the electronic program guide, facilitating the user to directly find and obtain a specific type of program information without the need for the user to screen from a large amount of program information, saving a lot of search operations, and improving the user experience.

Figure 15:
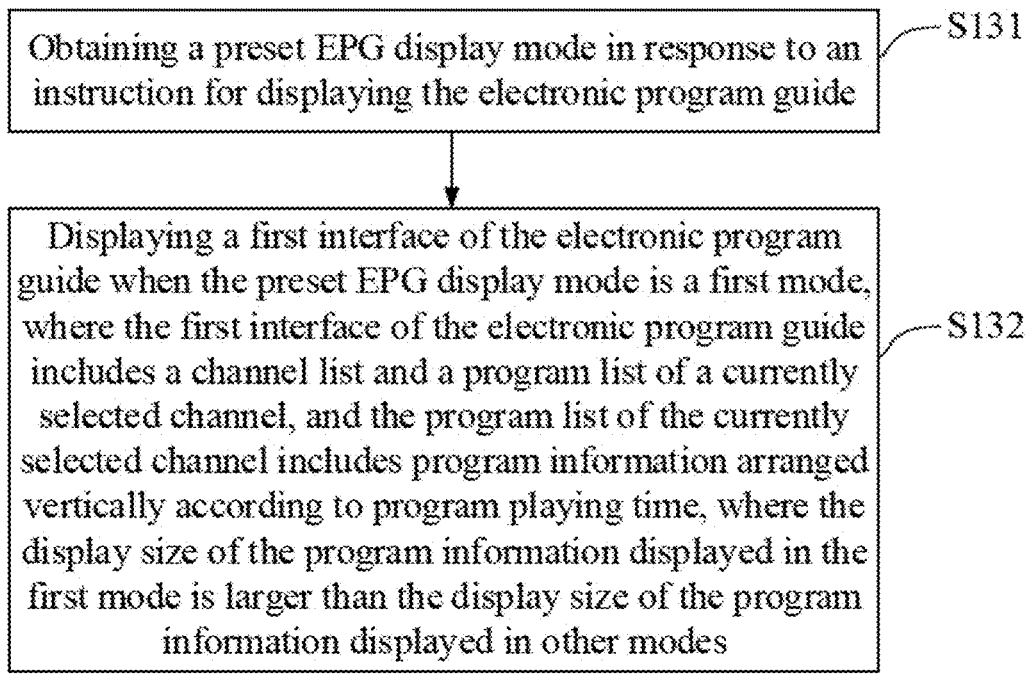
FIG. 15 is a method for displaying an electronic program guide according to some embodiments.

Based on the display apparatus provided in the above embodiments, an embodiment of the disclosure further provides a method for displaying an electronic program guide. As shown in FIG. 15, the method includes following steps.

S131: obtaining a preset EPG display mode in response to an instruction for displaying the electronic program guide.

In some embodiments, a value of a target flag bit is obtained, where the target flag bit is configured to record the preset EPG display mode, and the value of the target flag bit is saved according to an EPG display mode set by a user upon receipt of a setting operation of the EPG display mode input from the user; and the preset EPG display mode is determined according to the value of the target flag bit.

S132: displaying a first interface of the electronic program guide when the preset EPG display mode is a first mode, where the first interface of the electronic program guide includes a channel list and a program list of a currently selected channel, and the program list of the currently selected channel includes program information arranged vertically according to program playing time, where the display size of the program information displayed in the first mode is larger than the display size of the program information displayed in other modes.

In some embodiments, a second interface of the electronic program guide is displayed when the preset EPG display mode is a second mode, where the second interface of the electronic program guide includes a channel list and a program list of each channel, and the program list of each channel includes program information arranged horizontally according to the program playing time.

In some embodiments, the method for displaying the electronic program guide further includes: while the first interface of the electronic program guide is displayed, receiving a selection operation of first program information from the electronic program guide, obtaining a program information text corresponding to the first program information; and outputting the program information text by voice.

In some embodiments, the method for displaying the electronic program guide further includes: while the first interface of the electronic program guide is displayed, receiving a selection operation of first program information from a user, and highlighting the first program information according to a preset rule, where the preset rule is an adjustment rule for at least one display style.

In some embodiments, the program list of the currently selected channel includes program information screened from all program information within a specified time period of the currently selected channel according to a preset screening rule.

In some embodiments, the screened program information is program information matched with label information preselected by a user.

In some embodiments, the method for displaying the electronic program guide further includes: displaying a label selection interface in response to a label selection command from a user in the first interface of the electronic program guide, where the label selection interface includes a plurality of label information; and receiving a selection operation on at least one label information, where the selected label information is configured to screen out program information matching with the label information from all program information of the currently selected channel within a specified time period, and the program information matching with the label information is configured to be presented in the first interface of the electronic program guide to form the program list of the currently selected channel.

In some embodiments, the method for displaying the electronic program guide further includes: determining an adjusted time period in response to a time period adjustment command input from a user in the first interface of the electronic program guide, and updating the program list of the currently selected channel according to the adjusted time period, to present some or all of program information in the adjusted time period in the first interface of the electronic program guide.

In the method for displaying the electronic program guide in the above embodiments, the user can set the EPG display mode based on the interaction with the display apparatus. When receiving the input instruction for displaying the electronic program guide, the display apparatus obtains the current preset EPG display mode. When the preset EPG display mode is the first mode, the displayed first interface of the electronic program guide includes a channel list and a program list of the currently selected channel, and the program list of the currently selected channel includes program information arranged vertically according to the program playing time. Compared with the interface of the electronic program guide in other modes, the display size of the program information in the first interface of the electronic program guide is larger, and then the display effect is more prominent, so it is more beneficial for the specific group of people with vision defects to accurately obtain the program information, improving the user experience.

As described above, the display apparatus of the disclosure is configured with an HDMI interface, through which the display apparatus can be connected with various external devices, and the content such as images and videos of the external devices can be presented on the display screen of the display apparatus.

When presenting the image content provided by an external device, an information bar may generally pop up in the display apparatus to present information such as image parameters (e.g., image output frequency, number of frames, etc.) of the external device. However, the information presented in the information bar is generally a reference image parameter of the external device, and this parameter is a fixed value. In an actual operation, the image parameters of the external device change in real time, so that the information bar cannot accurately present relevant information of the external device, resulting in poor user experience.

In some embodiments, in order to improve the user experience of the display apparatus, a plurality of HDMI interfaces are configured in the display apparatus. Each HDMI interface is generally connected with an external device through corresponding EDID (Extended Display Identification Data), to present the image content provided by the external device in the display apparatus. The display apparatus indicates various functions supported by itself through the EDID, that is, if the display apparatus wants to present the image content provided by the external device, the display apparatus needs to have the function of presenting the image content.

In some embodiments, in order to provide users with better picture effect, in addition to good color performance, the display of the display apparatus also needs to have characteristics such as ultra-high refresh rate and fast response time, etc., to provide users with perfect picture sense.

When the external device is a game box, the image content provided by the game box generally has a high refresh rate. In this case, if the display apparatus wants to display the image content provided by the game box, the display apparatus needs to have the Freesync function (function of variable refresh rate). The refresh rate of the display with the FreeSync function synchronizes with the frame rate of the user's graphics card, reducing the input delay, and reducing stutter, picture tearing, dragging and other conditions, to provide the user with a perfect game experience.

In a scenario where the display apparatus is connected with an external device, the FreeSync technology requires the display apparatus to display an On-Screen Display (OSD) in the display when starting the Freesync function, to display the number of real-time output frames (frequency) of the graphics card of the external device. At the same time, an information bar (infobar) is displayed in the display to show the frequency of the input signal, that is, the fixed output frequency of the external device.

The rendering picture of the graphics card of the external device fluctuates. For example, in an e-sports game, the picture keeps changing, and the complexity of the picture also changes. However, the performance of the graphics card remains unchanged, so the number of output frames of the graphics card is high in simple scenarios and the number of output frames is low in complex scenarios, which makes the number of output frames of the graphics card fluctuate during the game, so that the frequency of display in the screen menu is refreshed in real time. However, the frequency of display in the information bar is a fixed frequency and will not be refreshed in real time, resulting in a collision between the display at the fixed frequency in the information bar and the display at the real-time refreshed frequency on the screen menu. These two display frequencies are asynchronous, causing confusion for users as to which display frequency should be used.

Figure 16A:
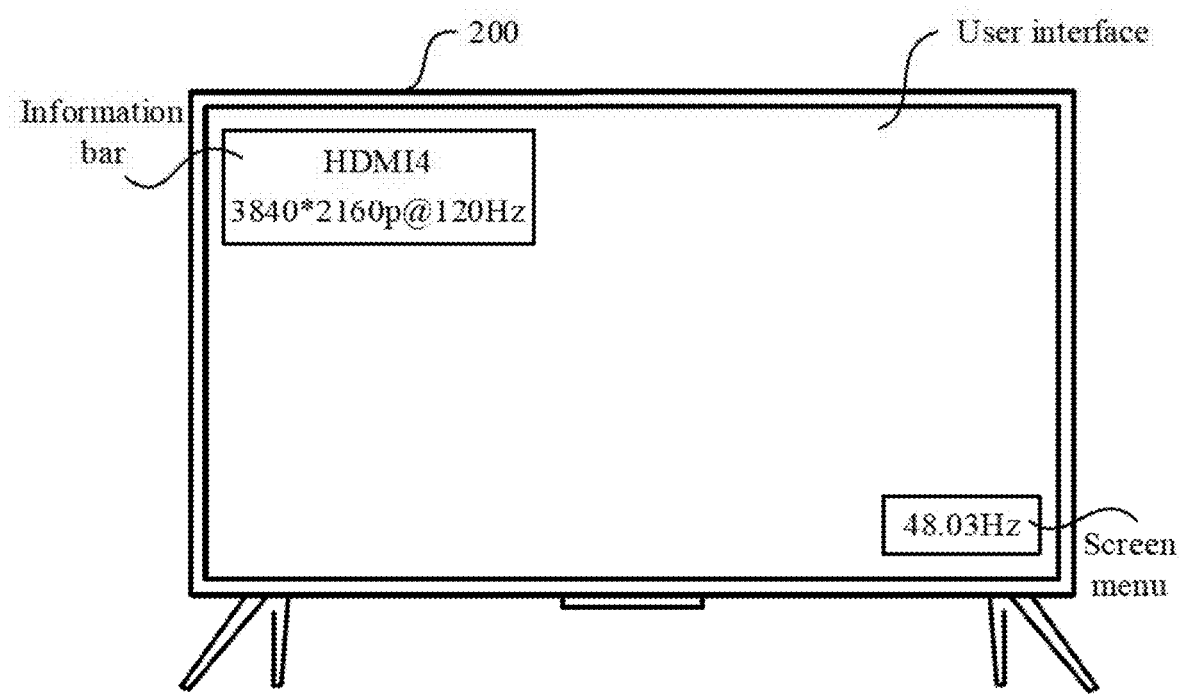
FIG. 16A is an effect diagram when an information bar and a screen menu display information asynchronously according to some embodiments.
Figure 16B:
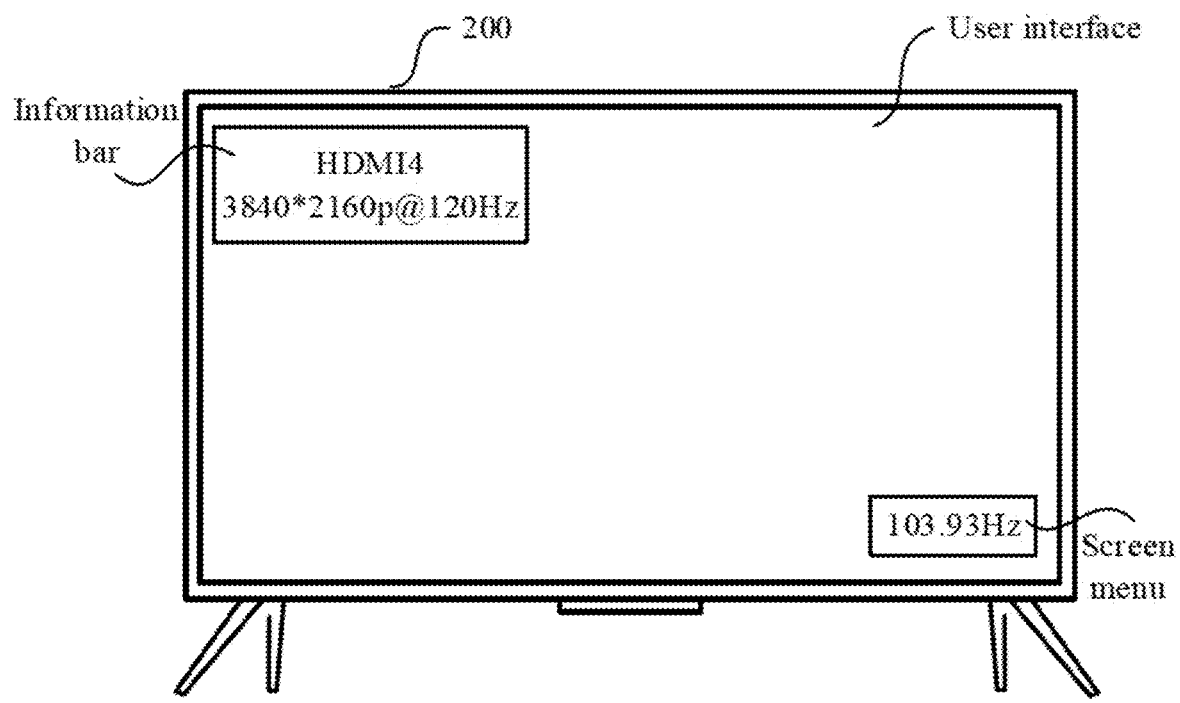
FIG. 16B is another effect diagram when the information bar and the screen menu display information asynchronously according to some embodiments.

FIG. 16A is an effect diagram when the information bar and the screen menu display information asynchronously according to some embodiments; and FIG. 16B is another effect diagram when the information bar and the screen menu display information asynchronously according to some embodiments. When the display apparatus is connected with a game box, the image content provided by the game box is presented in the display of the display apparatus. When the user needs to know relevant image parameters provided by the game box at runtime, the screen menu may be presented in the lower right corner of the display, and the information bar may be presented in the upper left corner of the display.

When displaying the asynchronous information, referring to FIG. 16A, the fixed output frequency 120 Hz of the external device is displayed in the information bar at a certain moment, while the real-time output frequency 48.03 Hz of the external device is displayed in the screen menu. At a next moment, referring to FIG. 16B, since the number of frames output by the graphics card of the external device changes in real time, the real-time output frequency 103.93 Hz of the external device is displayed in the screen menu, while the information bar still displays the fixed output frequency 120 Hz of the external device.

As can be seen, when the external device transmits the image data to the display apparatus continuously, the information displayed in the screen menu and the information displayed in the information bar are asynchronous, causing confusion to the user.

Furthermore, in order to avoid affecting the user's game experience, the screen menu can be displayed or not displayed according to the user's choice, that is, the real-time output frequency of the graphics card of the external device can be displayed or not displayed. If the display of the screen menu is canceled, the only way for the user to obtain the output frequency of the external device is the information bar, but the frequency displayed in the information bar is a fixed value, so that the user cannot accurately know the output frequency of the external device at the current moment, and the user experience is poor.

Therefore, in order to ensure that the user can know the accurate information in real time, the disclosure provides a display apparatus, and proposes a method for refreshing the display frequency of an information bar in real time. It is determined that the signal played by the user is a FreeSync signal, and the output frequency of the graphics card of the external device is obtained in real time, to refresh the information displayed in the information bar in real time. The information bar is displayed synchronously with the screen menu, so that the information bar can accurately display the relevant information of the external device, and the user knows what the current frequency is more clearly without doubts; and meanwhile, the user also knows what the current frequency is even when the screen menu is not displayed, making the product more intelligent and user-friendly, and improving the user experience.

Figure 17:
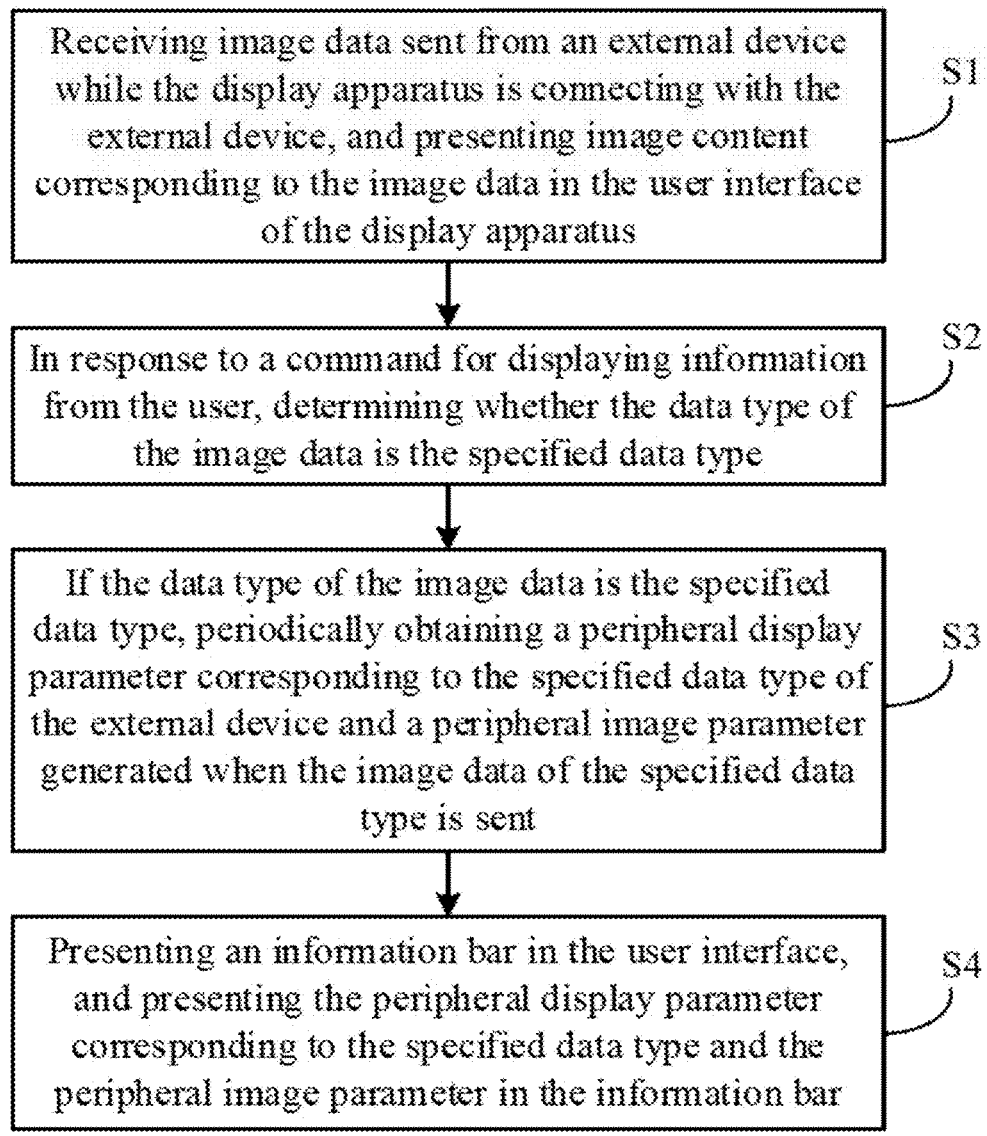
FIG. 17 is a flowchart of a method for displaying information in an information bar according to some embodiments.
Figure 18:
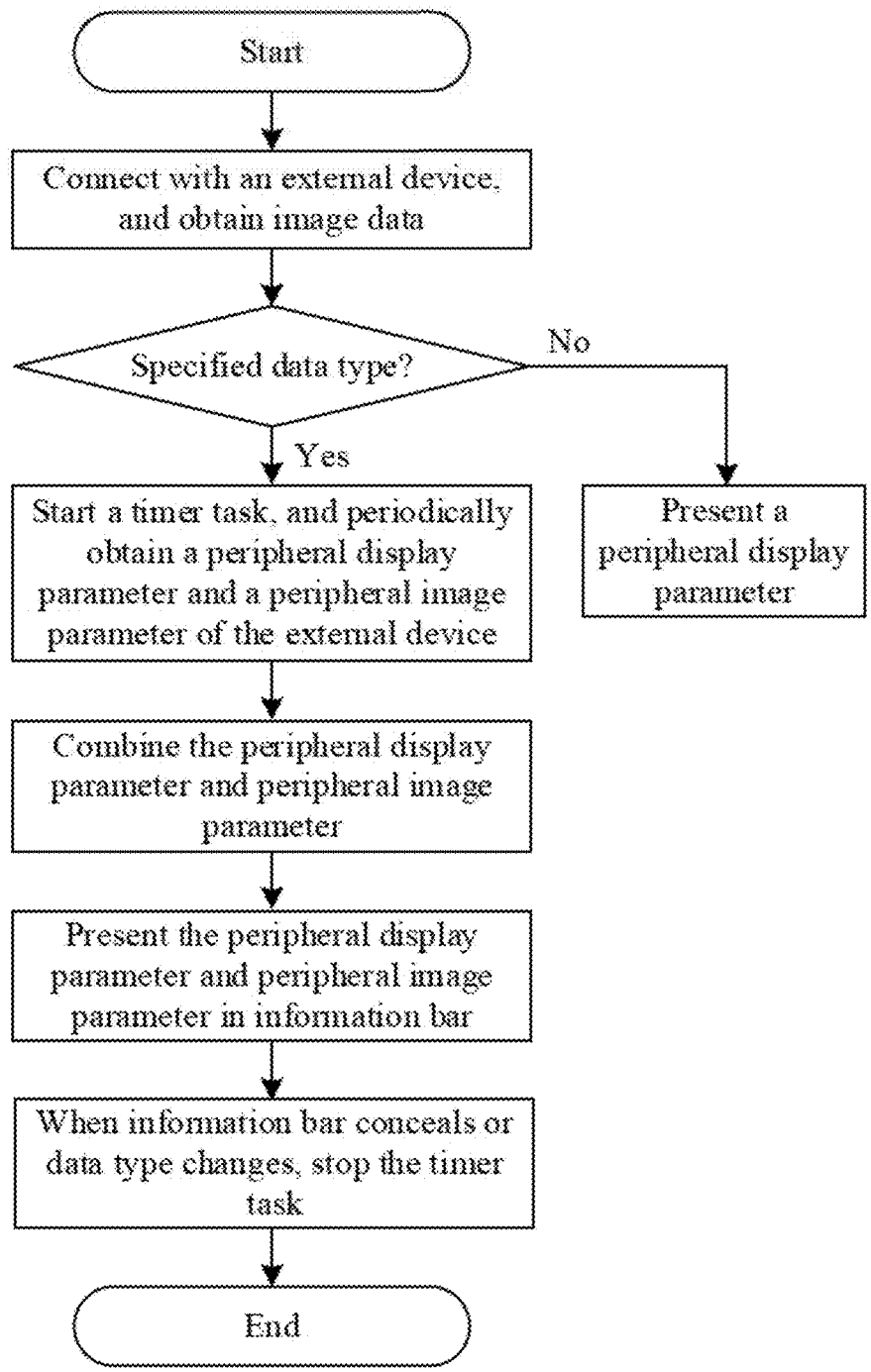
FIG. 18 is a data flow diagram of a method for displaying information in an information bar according to some embodiments.

FIG. 17 is a flowchart of a method for displaying information in an information bar according to some embodiments; and FIG. 18 is a data flow diagram of a method for displaying information in an information bar according to some embodiments. A display apparatus includes: a display configured to present a user interface; and a controller connected with the display. When the method for displaying information in the information bar shown in FIG. 17 and FIG. 18 is executed, the controller is configured to perform following steps.

S1: while connecting with an external device, receiving image data sent from the external device, and presenting image content corresponding to the image data in the user interface of the display apparatus.

When the external device is connected with the display apparatus through a specified HDMI interface, an access request is generated. The external device may be a game box, a power amplifier device, DVD, or the like. The specified HDMI interface may be HDMI interface 1, HDMI interface 2, HDMI interface 3 or HDMI interface 4.

Different external devices provide different contents, so the functions supported by the display apparatus side need to be different. For the game box, in order to improve the display effect of the game interface, the image content provided by the game box generally requires the display apparatus to have the Freesync function (function of variable refresh rate). When the display apparatus has the Freesync function, the external device can provide the image content required when the display apparatus implements the Freesync function.

The display apparatus obtains EDID data corresponding to the specified HDMI interface based on the access request, to realize the connection with the external device. After the display apparatus establishes a connection with the external device, the external device can transmit the image data to the display apparatus. After receiving the image data, the display apparatus presents the image content corresponding to the image data in the user interface.

In some embodiments, since the image content corresponding to the image data provided by the external device is to be presented in the display apparatus, the display apparatus needs to have the function of presenting the image content. However, if the display apparatus does not have the function of presenting the image content, the external device does not need to transmit the image data corresponding to the implementation of this function to the display apparatus. For example, if the display apparatus has the Freesync function, the external device sends the image data of Freesync type to the display apparatus; if the display apparatus does not have the Freesync function, the external device does not need to send the image data of Freesync type to the display apparatus, but only needs to send the image data of normal data type.

Therefore, in order to determine the type of the image data sent from the external device to the display apparatus accurately, the controller is further configured to perform the following steps when receiving the image data sent from the external device.

Step 11: while connecting with the external device, obtaining EDID data for realizing data transmission between the external device and the display apparatus, where identification data of different functions supported by the local display apparatus is stored in the EDID data.

Step 12: in response to first identification information existing in the EDID data, receiving the image data of a first specified data type associated with the first identification information sent from the external device, where the first identification information is configured to indicate that the local display apparatus has a specified function of presenting the image content corresponding to the first specified data type sent from the external device.

Step 13: in response to no first identification information existing in the EDID data, receiving the image data of a second data type not associated with the first identification information sent from the external device.

The type of the image data transmitted from the external device to the display apparatus is related to whether the display apparatus has a corresponding function, and whether the display apparatus has the corresponding function which can be identified in the EDID data. The EDID data is configured to realize the data transmission between the display apparatus and the external device. When the external device is connected with the display apparatus through a specified HDI interface, the corresponding EDID data is called by the specified HDMI interface to realize the data transmission. Each HDMI interface corresponds to the matched EDID data.

The EDID data structure is formed by splicing different fields, that is, the content of one field is configured to indicate that the display apparatus has the ability to provide a corresponding function, and one field corresponds to one function. The content of the field is used as the identification information, and the identification information for different functions supported by the display apparatus is stored in the EDID data. If there is identification data corresponding to a specified function in the EDID data, this case indicates that the display apparatus supports the ability to realize the specified function. For example, for the Freesync function (function of variable refresh rate), in order to indicate that the display apparatus supports the function of variable refresh rate, the identification data of a Freesync field needs to be added to the EDID data.

The external device is configured to provide the image data required when the display apparatus has the specified function. Therefore, the external device can determine the data type of the image data sent by itself according to whether the specified identification data of the specified function exists in the EDID data called by the display apparatus to realize the data transmission. The specified identification data is configured to indicate that the display apparatus has a specified function of presenting the image content corresponding to the specified image data sent from the external device. For example, the identification data of the Freesync field is configured to indicate that the display apparatus has the Freesync function capable of presenting the image data of Freesync type.

When the specified identification data exists in the EDID data, this case means that the display apparatus has the specified function. At this time, the external device reads the corresponding EDID data through the connected specified HDMI interface, and determines the specified identification data exists in the EDID data and then send the image data of the specified data type to the display apparatus. For example, the external device determines that the identification data of the Freesync field exists in the EDID data, indicating that the display apparatus has the Freesync function and can present the image data of Freesync type provided by the external device, so the external device can send the image data of Freesync type to the display apparatus.

After receiving the image data of the specified data type sent from the external device when it is determined that the specified identification data exists in the EDID data, the display apparatus can present the image content corresponding to the image data of the specified data type in the user interface of the display apparatus.

When the specified identification data does not exist in the EDID data, this case means that the display apparatus does not have the specified function. In this case, the external device reads the corresponding EDID data through the connected specified HDMI interface, and it is determined that the specified identification data does not exist in the EDID data and then send the image data of the normal data type without the need to send the image data of the specified data type to the display apparatus. For example, the external device determines that the identification data of the Freesync field does not exist in the EDID data, indicating that the display apparatus does not have the Freesync function and cannot present the image data of Freesync type provided by the external device, so the external device does not need to send the image data of Freesync type to the display apparatus, but only needs to send the image data of other normal data type.

After receiving the image data of the non-specified data type (that is, normal data type) sent from the external device when it is determined that the specified identification data does not exist in the EDID data, the display apparatus can present the image content corresponding to the image data of the non-specified data type in the user interface.

In some embodiments, whether the display apparatus has the specified function may be determined based on the user's settings. The display apparatus can configure the corresponding switches in the system according to different functions supported by the display apparatus. If the user turns on the switch of the specified function, this case means that the display apparatus has the specified function: if the user turns off the switch of the specified function, this case means that the display apparatus does not have the specified function. The states of the switches corresponding to all functions in the display apparatus are stored in the system setting parameters.

Since there are identification information or data for all functions supported by the display apparatus in the EDID data, in order to ensure the normal progress of data transmission, the identification data of each function in the EDID data can be modified in real time according to the users settings, to determine whether the specified identification data exists in the EDID data used in the current data transmission process, and then the external device can send the image data of the corresponding data type to the display apparatus based on the latest EDID data.

Therefore, when determining whether the specified identification data exists in the EDID data, the controller is further configured to perform the following steps.

Step 011: obtaining a system setting parameter when determining whether the specified identification data exists in the EDID data.

Step 012: if the system setting parameter indicates that the switch of the specified function of the local display apparatus is in the on state, retaining the specified identification data corresponding to the specified function in the EDID data to determine that the specified identification data exists in the EDID data.

Step 013: if the system setting parameter indicates that the switch of the specified function of the local end is in the off state, deleting the specified identification data corresponding to the specified function in the EDID data to determine that the specified identification data does not exist in the EDID data.

When the display apparatus is running, the user can turn on the switch of the specified function if the user wants the display apparatus to support the specified function. The switch of the specified function can be configured in the system settings, and the user turns on the switch of the specified function in the pop-up system setting interface by clicking the system setting control presented in the user interface. After the switch of the specified function is turned on, the corresponding on-state parameters of the specified function are stored in the system setting parameters. When the specified function is the Freesync function, the on-state parameters of the Freesync function are stored in the system setting parameters after the switch of the Freesync function is turned on.

In some embodiments, the on/off state of the switch of the specified function may be set when the display apparatus is running, or may be set after the display apparatus is connected with an external device, which is not limited in the disclosure.

When the system setting parameter indicates that the switch of the specified function is in the on state, this case means that the display apparatus supports the specified function, that is, the display apparatus can receive the image data corresponding to the specified function transmitted from the external device to the local display apparatus. Therefore, in order to facilitate informing the external device that the corresponding image data can be transmitted to the display apparatus, the corresponding specified identification data for implementing the specified function may be retained in the EDID data. In this case, the EDID data does not need to be modified, and the display apparatus can perform data transmission with the external device based on the EDID data, where the content in the data transmission is the image data of the specified data type. In this scenario, it can be determined that the specified identification data exists in the EDID data.

The specified identification data of the specified function in the EDID data is configured to be recognized by the external device, to notify the external device that the specified image data of the specified function can be transmitted to the display apparatus. That is to say, the identification data is used as an identifier for data transmission between the display apparatus and the external device. If there is identification data of a certain function, this case means that the external device can transmit the corresponding content; if there is no identification data of a certain function, this case means that the external device does not need to transmit the corresponding content.

When the system setting parameter indicates that the switch of the specified function is in the off state, this case means that the display apparatus does not support the specified function, that is, the display apparatus cannot receive and present the image data corresponding to the specified function transmitted from the external device to the local display apparatus. Therefore, in order to facilitate informing the external device that there is no need to transmit the corresponding image data to the display apparatus, the corresponding specified identification data for implementing the specified function may be deleted from the EDID data. In this case, the EDID needs to be regenerated based on the deletion operation, and the display apparatus can perform data transmission with the external device based on the newly-generated EDID data, where the content in the data transmission is the image data of normal data type. In this scenario, it can be determined that the specified identification data does not exist in the EDID data.

In some embodiments, if the display apparatus does not need to support the specified function in the previous data transmission process, the identification data of the specified function has been deleted from the EDID data. However, if the display apparatus needs to support the specified function in the next data transmission process, the switch of the specified function is turned on. Also, the identification data of the specified function needs to be rewritten into the EDID data, and the data transmission between the display apparatus and the external device is realized based on the newly-generated EDID data. In this case, the content in the data transmission includes the image data of the specified function. For the specific processes of the identification and data transmission performed by the external device, reference may be made to the foregoing content, which will not be repeated here.

As can be seen, when the external device is connected with the display apparatus, whether the display apparatus supports the specified function can be determined according to the user's settings, to modify the identification data in the EDID data in real time. If the specified identification data of the specified function exists in the EDID data, the external device is informed to send the image data of the specified data type to the display apparatus, and the display apparatus presents the image content corresponding to the image data of the specified data type in the user interface. If the specified identification data of the specified function does not exist in the EDID data, the external device is informed to send only the image data of the normal data type instead of send the image data of the specified data type to the display apparatus, and the display apparatus presents the image content corresponding to the image data of the normal data type in the user interface.

S2: in response to a command for displaying information from the user, determining whether the data type of the image data is the specified data type.

When the external device is a game box or an e-sports host, the reference output frequency of the e-sports host can be set to 120 Hz, the display apparatus is connected with the e-sports host through an HDMI cable, and the interface is HDMI interface 3 or HDMI interface 4. The display apparatus is set to the enhanced mode, and the switch of the Freesync function is turned on in the game mode. Then, the display apparatus presents the image content corresponding to the image data of Freesync type sent from the external device.

After the display apparatus is connected with the external device and presents the image content provided by the external device, if the user wants to view the output frequency of the graphics card of the current external device, a trigger operation can be performed. The trigger operation may be done via a button on the remote control, and the button on the remote control is pressed to generate an information display instruction, to pop up an information bar in the user interface and use the information bar to present the real-time output frequency of the graphics card of the external device.

The real-time output frequency of the graphics card of the external device is generally presented in the screen menu, while the source of the frequency value displayed in the information bar is generally the reference output frequency of the graphics card of the external device, which is a fixed value. Therefore, in order to realize the real-time refresh of the frequency displayed in the information bar, the path for reading frequency value of the information bar can be the same as the path for reading frequency value of the screen menu, that is, the frequency values are read from one source, to determine the real-time output frequency of the graphics card of the external device.

The image data provided by the external device includes different types of data, but not all information corresponding to the different types of data can be displayed, where the specified data type corresponding to the specified function supported by the display apparatus can characterize the operating parameters of the external device, and has display significance. For example, when the display apparatus has the Freesync function, the information of the Freesync data type may be presented in the information bar of the display apparatus, to characterize the operating parameters of the external device when sending the image data of Freesync type.

Therefore, when the relevant information of the external device is presented in the information bar, determination can be made based on the image type of the image data sent from the external device to the display apparatus, in order to ensure that the relevant information of the specified data type can be presented in the information bar.

When sending the image data to the display apparatus, the external device may synchronously inform the display apparatus of the data type of the image data. The data types include a specified data type and a normal data type.

S3: if the data type of the image data is the specified data type, periodically obtaining a peripheral display parameter corresponding to the specified data type of the external device and a peripheral image parameter generated when the image data of the specified data type is sent.

The image data sent from the external device is parsed. If the data type of the image data is determined to be the specified data type, this case means that the display apparatus has the specified function and can present the operating parameters generated when the external device provides the specified image data required by the display apparatus to realize the specified function, where the operating parameters are the information to be displayed in the information bar.

The operating parameters include the peripheral display parameter and the peripheral image parameter. The peripheral display parameter is configured to characterize the resolution in presenting the image content provided by the external device and the HDMI interface information, etc.; and the peripheral image parameter is configured to characterize the real-time output frequency of the graphics card generated when the external device transmits the image data of the specified data type.

In order to ensure that the information displayed in the information bar can be refreshed in real time, the display apparatus adopts a periodic reading method when reading the relevant information of the external device.

When periodically obtaining the peripheral display parameter corresponding to the specified data type of the external device and the peripheral image parameter generated when the image data is sent, the controller is further configured to perform the following steps.

Step 31: obtaining a preset time interval, where the preset time interval is configured to characterize a time period for obtaining parameters.

Step 32: regularly obtaining the peripheral display parameter corresponding to the specified data type of the external device and the peripheral image parameter generated when the image data is sent according to the preset time interval.

When the data type of the image data is the specified data type, a timer task is started, and the preset time interval can be determined based on the timer task, where the preset time interval is a time period for obtaining the relevant parameters of the external device. The preset time interval may be 80 ms or other data, and may be determined according to actual requirements.

The peripheral display parameter corresponding to the specified data type of the external device and the peripheral image parameter generated when the image data is sent can be regularly obtained based on the preset time interval.

Since the peripheral display parameter corresponding to the specified data type is a fixed value and will not change with time, the peripheral display parameter obtained every 80 ms remains unchanged. Based on this, after the peripheral display parameter corresponding to the specified data type is obtained for the first time, the obtaining action may not be performed again.

However, the peripheral image parameter is the real-time output frequency of the graphics card of the external device, which is a fluctuating value, so the peripheral image parameter can be obtained every 80 ms based on the preset time interval, to regularly obtain the real-time information of the external device.

In some embodiments, the termination moment of the timer task is when the display of the information bar is cancelled or the data type of the image data sent from the external device to the display apparatus changes. For example, when the data type of the image data is normal data type, the peripheral image parameter is no longer obtained.

Therefore, based on the periodic acquisition of the real-time information of the external device, the real-time refresh of the information displayed in the information bar can be realized.

S4: presenting an information bar in the user interface, and presenting the peripheral display parameter corresponding to the specified data type and the peripheral image parameter in the information bar.

After the peripheral display parameter corresponding to the specified data type and the peripheral image parameter are obtained, the peripheral display parameter and the peripheral image parameter are combined via combining characters to present the combined information in the information bar. However, the peripheral image parameter changes with the real-time output frequency of the image data sent from the external device to the display apparatus, so the information displayed in the information bar can be refreshed in real time based on the peripheral image parameter obtained in real time at the preset time interval, to ensure that the information displayed in the information bar is consistent with the real-time output information generated by the external device, and ensure the accuracy of the information displayed in the information bar, so that the user can intuitively see the frequency change of the external device, and the user experience is good.

In some embodiments, when the display apparatus presents the content provided by the external device, the user may view the information of the external device by invoking the information bar, and may also invoke the screen menu to display the real-time information of the external device. The display of the screen menu may be automatically triggered when the user turns on the switch of the specified function configured in the display apparatus, or may be performed based on the user's trigger operation. If the user does not want to view the information in the screen menu, the user can exit the display of the screen menu by the bigger operation.

Figure 19A:
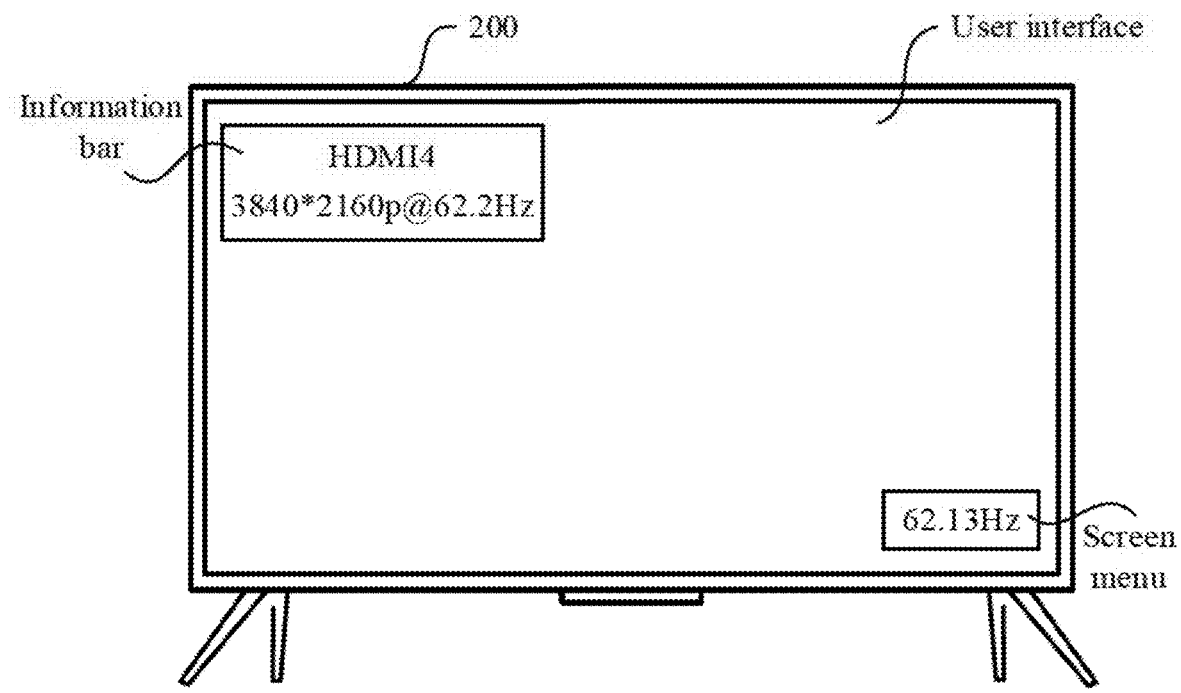
FIG. 19A is an effect diagram when the information bar and the screen menu display information synchronously according to some embodiments.
Figure 19B:
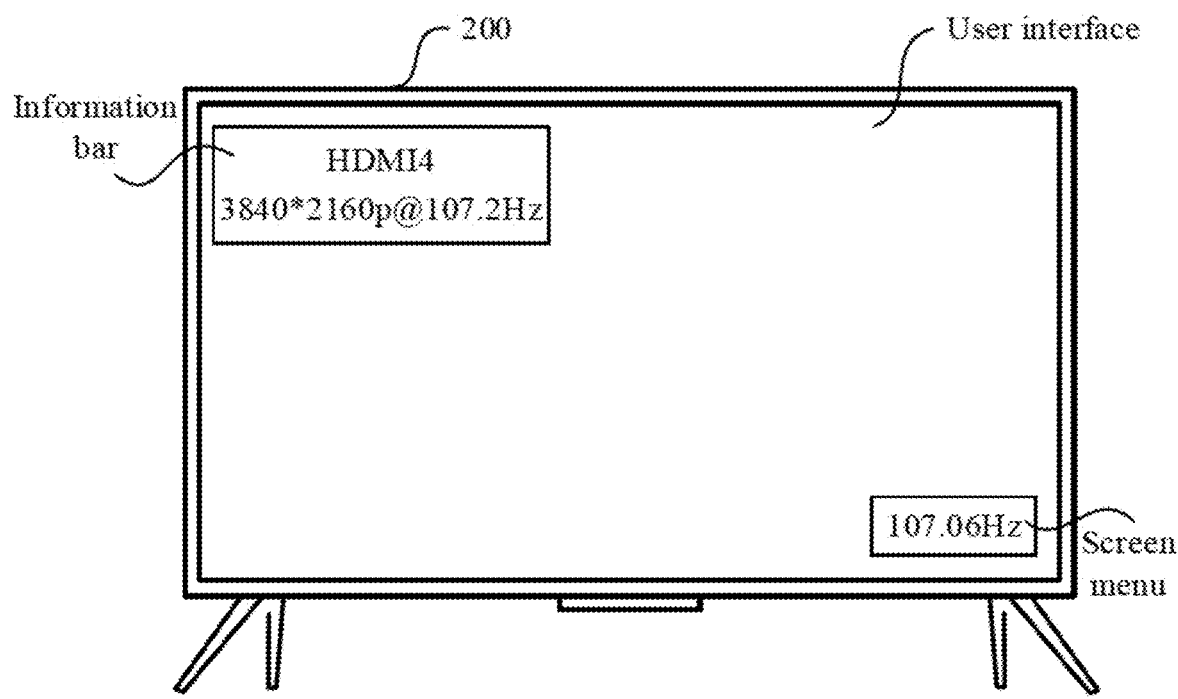
FIG. 19B is another effect diagram when the information bar and the screen menu display information synchronously according to some embodiments.

FIG. 19A is an effect diagram when the information bar and the screen menu display information synchronously according to some embodiments: and FIG. 19B is another effect diagram when the information bar and the screen menu display information synchronously according to some embodiments. When displaying the synchronous information, referring to FIG. 19A, the peripheral display parameter and the peripheral image parameter of the external device are displayed in the information bar at a certain moment, where the peripheral display parameter includes resolution (3840*2160p) and the HDMI interface information (HDMI Interface 4), and the peripheral image parameter is the real-time output frequency (62.2 Hz) of the graphics card of the external device. If the user wants to present the screen menu, the real-time output frequency of the graphics card of the external device is displayed as 62.13 Hz in the screen menu at this moment. It can be seen that the information in the information bar is basically the same as the information in the screen menu.

At the next moment referring to FIG. 19B, since the number of frames output from the graphics card of the external device changes in real time, the information displayed in the screen menu and the information bar also changes. The peripheral display parameter and the peripheral image parameter of the external device are displayed in the information bar at this moment, where the peripheral display parameter includes resolution (3840*2160p) and HDMI interface information (HDMI interface 4), and the peripheral image parameter is the real-time output frequency (107.2 Hz) of the graphics card of the external device. If the user wants to present the screen menu, the real-time output frequency of the graphics card of the external device is displayed as 107.06 Hz in the screen menu at this moment. It can be seen that the information in the information bar is basically the same as the information in the screen menu.

Therefore, as the output frequency of the graphics card of the external device changes in real time, the information presented in the information bar and the screen menu also changes synchronously, so that the information bar can present the operating parameters of the external device in real time, convenient for users to view.

In some embodiments, the peripheral image parameter can only be presented when the display apparatus has a specified function, that is, when the external device sends the image data of the specified data type to the display apparatus. There is no need to display the parameters generated when the external device transmits the image data of other normal data type.

Therefore, when the data type of the image data transmitted from the external device to the display apparatus is a normal data type, the controller is further configured to perform the following steps.

Step 51: if the data type of the image data is a second data type different from the specified data type, obtaining a peripheral display parameter corresponding to the second data type of the external device.

Step 52: displaying the peripheral display parameter corresponding to the second data type in the information bar.

When the data type of the image data is the second data type (that is, normal data type), meaning that the display apparatus does not have the specified function, the external device does not need to send the image data of the specified data type required to realize the specified function to the display apparatus, but only needs to send the image data of the normal data type.

Therefore, when the user needs to display the information bar, there is no need to present the peripheral image parameter generated when the external device transmits the image data of the specified data type, and there is only a need to present the peripheral display parameter.

In this case, the peripheral display parameter corresponding to the second data type of the external device is obtained, and the peripheral display parameter corresponding to the second data type is displayed in the information bar, that is, only the normal resolution parameter, HDMI interface information and others are displayed in the information bar.

Figure 20:
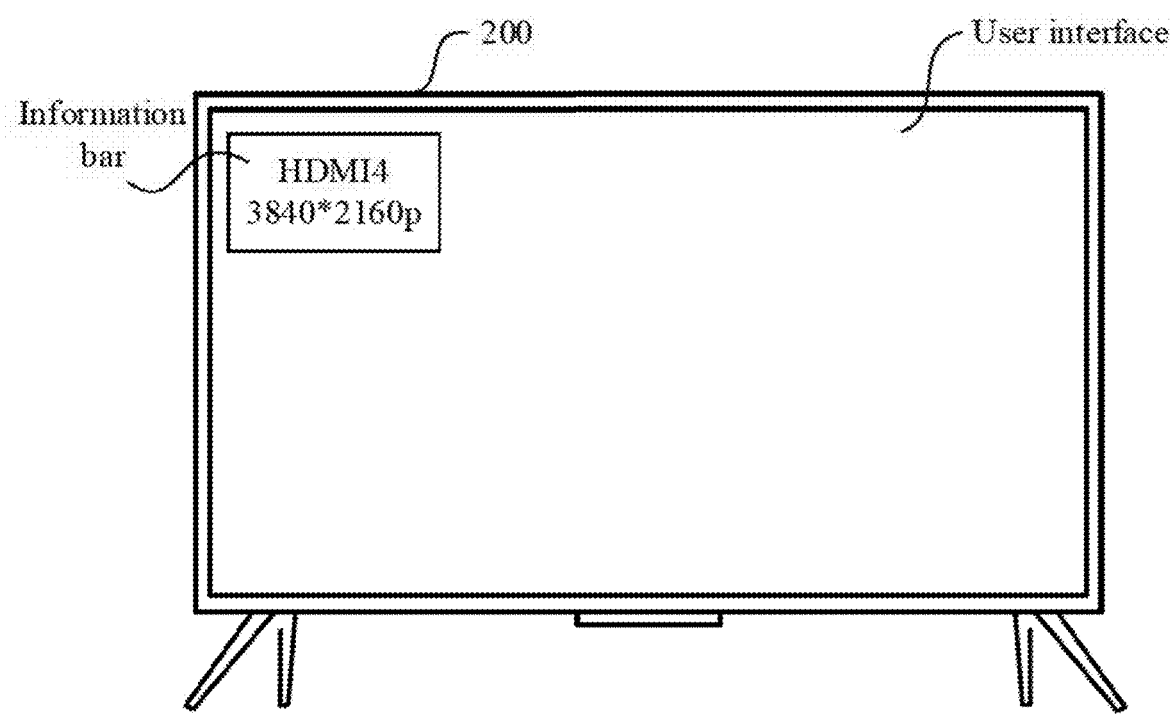
FIG. 20 is an effect diagram when the information bar displays information of non-specified data type according to some embodiments.

FIG. 20 is an effect diagram when the information bar displays information of the second data type according to some embodiments. Referring to FIG. 20, when the data type of the image data transmitted from the external device to the display apparatus is a normal data type, only the information bar is displayed in the display apparatus, while the screen menu is not displayed. The peripheral display parameter of the external device is displayed in the information bar at this moment, and the peripheral display parameter includes resolution (3840*2160p) and HDMI interface information (HDMI interface 4).

In some embodiments, the peripheral display parameter can be displayed in the information bar, regardless of whether the data type of the image data transmitted by the external device is the specified data type or normal data type. In order to facilitate the user to quickly distinguish whether the current information is the information corresponding to the specified data type or the information corresponding to the normal data type based on the content presented in the information bar, the information corresponding to the normal data type may be set to be displayed as an integer value without a decimal point; and the information corresponding to the specified data type is a numerical value with a decimal point.

A display apparatus according to an embodiment of the disclosure receives image data sent from an external device when realizing the real-time refresh and display of information in an information bar; periodically obtains a peripheral display parameter corresponding to the specified data type of the external device and a peripheral image parameter generated when the image data of the specified data type is sent if the data type of the image data is the specified data type; and presents the peripheral display parameter corresponding to the specified data type and the peripheral image parameter in the information bar. It can be seen that the display apparatus can obtain relevant parameters of the corresponding external device in real time based on the data type of the received image data, to refresh the information displayed in the information bar in real time, and ensure that the information displayed in the information bar is consistent with the real-time output information generated by the external device. The information bar accurately displays the relevant information of the external device, so that the user can intuitively see the information change of the external device, and the user experience is good.

In some embodiments of the disclosure, the receiving the image data sent from the external device while the display apparatus is connecting with the external device, includes: while the displaying apparatus is connecting with the external device, obtaining EDID data for realizing data transmission between the display apparatus and the external device, where identification data of different functions supported by the local display apparatus is stored in the EDID data; in response to first identification information associated with a specified data type supported by the display apparatus being in the EDID data, receiving the image data of the specified data type sent from the external device, where the specified identification data is configured to indicate that the local display apparatus has a specified function of presenting the image content corresponding to the specified data type sent from the external device; in response to first identification information associated with a specified data type supported by the display apparatus being not in the EDID data, receiving the image data of a second data type different from the specified data type sent from the external device.

In some embodiments of the disclosure, the method further includes: obtaining a system setting parameter; if the system setting parameter indicates that a switch of the specified function of the local display apparatus is in an on state, retaining the identification data corresponding to the specified data type in the EDID data to make sure that the first identification information exists in the EDID data; if the system setting parameter indicates that the switch of the specified function of the local display apparatus is in an off state, deleting the identification data corresponding to the specified data type in the EDID data to make sure that the first identification information does not exist in the EDID data.

In some embodiments of the disclosure, the method further includes: obtaining a peripheral display parameter corresponding to the second data type of the external device if the data type of the image data is the second data type; and displaying the peripheral display parameter corresponding to the second data type in the information bar.

In some embodiments of the disclosure, the periodically obtaining the peripheral display parameter corresponding to the specified data type of the external device and the peripheral image parameter generated when the image data is sent, includes: determining a preset time interval that is configured to characterize a time period for obtaining parameters; and regularly obtaining the peripheral display parameter corresponding to the specified data type of the external device and the peripheral image parameter generated when the image data is sent according to the preset time interval.

In the method for displaying information in the information bar and the display apparatus according to embodiments of the disclosure, during transmission of the image data from the external device, the real-time refresh and display of information in the information bar can be realized; the peripheral display parameter corresponding to the specified data type of the external device and the peripheral image parameter generated when the image data of the specified data type is sent are periodically obtained if the data type of the image data is the specified data type; and the peripheral display parameter corresponding to the specified data type and the peripheral image parameter are presented in the information bar. It can be seen that this method and display apparatus can obtain the relevant parameters of the corresponding external device in real time based on the data type of the received image data, to refresh the information displayed in the information bar in real time, and ensure that the information displayed in the information bar is consistent with the real-time output information generated by the external device. The information bar accurately displays the relevant information of the external device, so that the user can intuitively see the information update of the external device, and the user experience is good.

For the convenience of explanation, the above description has been made in combination with specific embodiments.

However, the above discussion is not intended to be exhaustive or to limit embodiments to the specific forms disclosed above. Numerous modifications and variations can be obtained in light of the above teachings. The above embodiments are chosen and described in order to better explain the principles and practical applications, to enable those skilled in the art to better utilize the described embodiments and various variant embodiments suitable for specific uses.

What is claimed is:

1. A display apparatus, comprising:
a display configured to display a user interface for presenting an electronic program guide (EPG);
a first controller in connection with the display configured to:
present a first interface of the EPG on the user interface according to a first EPG display mode, wherein the electronic program guide comprises a first channel list and a first program list, and the first program list comprises one or more live broadcast programs, wherein program information in the first program list is presented in size smaller than program information presented in a second EPG display mode different from the first EPG display mode, and text information is output via voice in response to a selection of a program from the second EPG display mode;
read a list of live channels at a current moment and encode the list of live channels to generate live broadcast information;
send a first request comprising the live broadcast information to a server for the server to detect live broadcast programs supporting replay according to the live broadcast information and generate replay data, wherein the first request is configured to cause the server to determine replay data to be provided to the display apparatus according to a first live broadcast program comprised in the live broadcast information, and the replay data comprises identifier information about a first media file for replaying a first live broadcast program in a time period except for a live broadcast period of the first live broadcast program; and
receive the replay data sent from the server, and in response to the replay data comprising identifier information about a second media file for replaying a second live broadcast program in a time period except for a live broadcast period of the second live broadcast program, control the electronic program guide to display the second live broadcast program with a visual replay identifier, wherein an information bar displayed during live broadcast of the second live broadcast program comprises a replay control, and the replay control is configured to cause the first controller to control the user interface to play the second media file.

2. The display apparatus according to claim 1, wherein the first controller is further configured to:
after receiving a confirmation operation for the replay control from a user, send a second request comprising identifier information of the second media file to the server, wherein the second request is configured to cause the server to determine a playing address according to the identifier information of the second media file; and
receive the playing address sent from the server, and control the user interface to play the second media file based on the playing address.

3. The display apparatus according to claim 1, wherein the first controller is further configured to:
in response to the replay data not comprising identifier information about a third media file for replaying a third live broadcast program in a time period except for a live broadcast period of the third live broadcast program, control the electronic program guide to display the third live broadcast program without a visual replay identifier.

4. The display apparatus according to claim 1, wherein the first controller is further configured to:
determine live broadcast programs of all channels in the electronic program guide at a current moment; and
control the live broadcast programs in the electronic program guide of the user interface to display replay identifiers based on the replay data received from the server.

5. The display apparatus according to claim 1, wherein the first controller is further configured to:
in response to an EPG display mode being configured as the second EPG display mode, present a second interface of the EPG, wherein program information in a second program list on the second interface is presented in size larger than program information presented in the first interface of the EPG, and
receive a selection of a fourth program from the second program list, obtain text information about the fourth program and output the text information via voice.

6. The display apparatus according to claim 5, wherein the first controller is further configured to:
receive a selection of a fifth program on the second interface of the EPG, and highlight information about the fifth program according to a preset rule, wherein the preset rule is an adjustment rule for at least one display style.

7. The display apparatus according to claim 5, wherein the first controller is further configured to:
screen all programs from a first channel within a specified time period according to a preset rule to determine the second program list, wherein the preset rule comprises label information of the programs from the first channel.

8. The display apparatus according to claim 7, wherein the preset rule is configured by a user.

9. The display apparatus according to claim 7, wherein the label information comprises information about audio description, subtitles or sign language.

10. A method for displaying a live broadcast program on a display apparatus, comprising:
presenting a first interface of an electronic program guide (EPG), on a user interface of the display apparatus according to a first EPG display mode, wherein the electronic program guide comprises a first channel list and a first program list, and the first program list comprises one or more live broadcast programs, wherein program information in the first program list is presented in size smaller than program information presented in a second EPG display mode different from the first EPG display mode, and text information is output via voice in response to a selection of a program from the second EPG display mode;
reading a list of live channels at a current moment and encoding the list of live channels to generate live broadcast information;
sending a first request comprising the live broadcast information to a server for the server to detect live broadcast programs supporting replay according to the live broadcast information and generate replay data, wherein the first request is configured to cause the server to determine replay data to be provided to the display apparatus according to a first live broadcast program comprised in the live broadcast information, and the replay data comprises identifier information about a first media file for replaying a first live broadcast program in a time period except for a live broadcast period of the first live broadcast program; and receiving the replay data sent from the server, and in response to the replay data comprising identifier information about a second media file for replaying a second live broadcast program in a time period except for a live broadcast period of the second live broadcast program, controlling the electronic program guide to display the second live broadcast program with a visual replay identifier, wherein an information bar displayed during live broadcast of the second live broadcast program comprises a replay control, and the replay control is configured to control the user interface to play the second media file.

11. The method according to claim 10, further comprising:

after receiving a confirmation operation for the replay control from a user, sending a second request comprising identifier information of the second media file to the server, wherein the second request is configured to cause the server to determine a playing address according to the identifier information of the second media file; and receiving the playing address sent from the server, and controlling the user interface to play the second media file based on the playing address.

12. The method according to claim 10, further comprising:

in response to the replay data not comprising identifier information about a third media file for replaying a third live broadcast program in a time period except for a live broadcast period of the third live broadcast program, controlling the electronic program guide to display the third live broadcast program without a visual replay identifier.

13. The method according to claim 10, further comprising:

determining live broadcast programs of all channels in the electronic program guide at a current moment; and controlling the live broadcast programs in the electronic program guide of the user interface to display replay identifiers based on the replay data received from the server.

14. The method according to claim 10, further comprising:

in response to an EPG display mode being configured as the second EPG display mode, presenting a second interface of the EPG, wherein program information in a second program list on the second interface is presented in size larger than program information presented in the first interface of the EPG, and receiving a selection of a fourth program from the second program list, obtain text information about the fourth program and output the text information via voice.

15. The method according to claim 14, further comprising:

receiving a selection of a fifth program on the second interface of the EPG, and highlighting information about the fifth program according to a preset rule, wherein the preset rule is an adjustment rule for at least one display style.

16. The method according to claim 14, further comprising:

screening all programs from a first channel within a specified time period according to a preset rule to determine the second program list, wherein the preset rule comprises label information of the programs from the first channel.

17. The method according to claim 16, wherein the preset rule is configured by a user.

18. The method according to claim 16, wherein the label information comprises information about audio description, subtitles or sign language.

\* \* \* \* \*